United States Patent
Kim et al.

(10) Patent No.: US 9,024,870 B2
(45) Date of Patent: May 5, 2015

(54) MOBILE TERMINAL AND CONTROL METHOD THEREOF

(71) Applicant: LG Electronics Inc., Seoul (KR)

(72) Inventors: Kyung Jin Kim, Seoul (KR); Hang Ah Jo, Seoul (KR); Ji Hyun Kim, Seoul (KR); Yong Man Park, Seoul (KR); Sae Kyu Park, Seoul (KR); Jung Ah Hwang, Seoul (KR); Jee Young Chun, Seoul (KR); Min Su Park, Seoul (KR)

(73) Assignee: LG Electronics Inc., Seoul (KR)

( * ) Notice: Subject to any disclaimer, the term of this patent is extended or adjusted under 35 U.S.C. 154(b) by 43 days.

(21) Appl. No.: 13/759,674

(22) Filed: Feb. 5, 2013

(65) Prior Publication Data

US 2013/0147706 A1  Jun. 13, 2013

Related U.S. Application Data

(63) Continuation of application No. 12/566,733, filed on Sep. 25, 2009.

(30) Foreign Application Priority Data

Sep. 26, 2008 (KR) .......................... 10-2008-0094884
Oct. 6, 2008 (KR) .......................... 10-2008-0097538

(51) Int. Cl.
*G09G 5/00* (2006.01)
*G06F 1/16* (2006.01)
*G06F 3/041* (2006.01)

(52) U.S. Cl.
CPC ................ *G09G 5/00* (2013.01); *G06F 1/1626* (2013.01); *G06F 1/1684* (2013.01); *G06F 3/0414* (2013.01)

(58) Field of Classification Search
USPC ................. 345/156, 173, 178, 647, 676, 684; 455/418, 566
See application file for complete search history.

(56) References Cited

U.S. PATENT DOCUMENTS

| | | | |
|---|---|---|---|
| 4,110,836 A | 8/1978 | Bennett et al. | |
| 6,509,907 B1 * | 1/2003 | Kuwabara | 345/684 |
| 7,052,452 B2 | 5/2006 | Ulmsten et al. | |
| 7,404,140 B2 | 7/2008 | O Rourke | |
| 7,583,197 B2 | 9/2009 | Wesby | |
| 8,094,010 B2 | 1/2012 | Wesby-van Swaay | |
| 2004/0046637 A1 | 3/2004 | Wesby | |
| 2004/0153965 A1 | 8/2004 | O Rourke | |

(Continued)

FOREIGN PATENT DOCUMENTS

| | | |
|---|---|---|
| JP | 2004-177993 A | 6/2004 |
| WO | WO 2006/013363 A1 | 2/2006 |

OTHER PUBLICATIONS

PCT International Search Report and the Written Opinion of the International Searching Authority for Application No. PCT/KR2009/005479 dated Apr. 19, 2010 (11 pages).

*Primary Examiner* — Fred Tzeng
(74) *Attorney, Agent, or Firm* — Fish & Richardson P.C.

(57) ABSTRACT

A control method of a mobile terminal is disclosed. The control method of a mobile terminal includes: acquiring a pressure signal through a pressure sensing module for sensing a change in pressure applied to at least one part of the body in at least two degrees; and generating an event for changing a display state of a display unit through a control signal to be matched to the pressure signal. Emotional quality can be improved by changing a display state of a display unit in response to a change in pressure applied to the body.

6 Claims, 24 Drawing Sheets

(56) References Cited

U.S. PATENT DOCUMENTS

| | | |
|---|---|---|
| 2006/0140621 A1 | 6/2006 | Misawa |
| 2007/0195074 A1 | 8/2007 | Gelissen |
| 2008/0108340 A1* | 5/2008 | Karstens .................. 455/418 |
| 2008/0115091 A1 | 5/2008 | Jung et al. |
| 2009/0107009 A1 | 4/2009 | Bishop et al. |
| 2009/0160793 A1* | 6/2009 | Rekimoto .................. 345/173 |
| 2009/0212905 A1 | 8/2009 | Batz et al. |
| 2009/0256807 A1* | 10/2009 | Nurmi ...................... 345/173 |
| 2010/0035656 A1* | 2/2010 | Pan ............................ 455/566 |
| 2010/0123686 A1* | 5/2010 | Klinghult et al. ........... 345/178 |
| 2011/0193881 A1* | 8/2011 | Rydenhag .................. 345/647 |
| 2012/0105488 A1* | 5/2012 | Kondo et al. ............... 345/676 |

* cited by examiner

MOBILE TERMINAL AND CONTROL METHOD THEREOF

CROSS-REFERENCE TO RELATED APPLICATIONS

This application is a continuation of U.S. application Ser. No. 12/566,733 filed Sep. 25, 2009, now allowed, which claims the benefit of Korean Patent Application No. 10-2008-0097538 filed on Oct. 6, 2008 and No. 10-2008-0094884 filed on Sep. 26, 2008, both of which are hereby incorporated by reference.

FIELD OF THE APPLICATION

The present invention relates to a control method of a mobile terminal which can improve emotional quality by changing a display state of a display unit in response to a change in pressure applied to the body.

DISCUSSION OF THE RELATED ART

As the functions of terminals, such as personal computers, laptops, mobile phones, etc., have become diversified, terminals are implemented in the form of a multimedia player having comprehensive functions such as capturing still and video images, playing back music or video files, playing games, receiving broadcasts, and the like.

Terminals may be divided into mobile terminals and stationary terminals according to mobility. Mobile terminals may be divided into handheld terminals and vehicle mount terminals according to whether or not a user can carry it with them.

In order to support and increase the functionality of terminals, the improvement of structural parts and/or software parts of the terminals can be taken into account.

A mobile terminal may include an input unit including various operation keys to perform various functions of the mobile terminal.

SUMMARY OF THE INVENTION

The present invention has been made in an effort to provide a control method of a mobile terminal, which can improve emotional quality by changing a display state of a display unit in response to a change in pressure applied to the body.

Technical problems to be solved by the present invention are not limited to above-mentioned problems, and any other technical problems, which were not mentioned above, would be obviously appreciated to those skilled in the art from the following description.

BRIEF DESCRIPTION OF THE DRAWINGS

The accompany drawings, which are included to provide a further understanding of the invention and are incorporated on and constitute a part of this specification illustrate embodiments of the invention and together with the description serve to explain the principles of the invention.

FIG. 8b is a flow chart of a control method of the mobile terminal of FIG. 8a;

FIG. 10b is a flow chart of a control method of the mobile terminal of FIG. 10a;

FIG. 11b is a flow chart of a control method of the mobile terminal of FIG. 11a;

DETAILED DESCRIPTION OF PREFERRED EMBODIMENTS

Reference will now be made in detail embodiments of the invention examples of which are illustrated in the accompanying drawings.

The present invention will now be described more fully with reference to the accompanying drawings, in which exemplary embodiments of the invention are shown. The invention may, however, be embodied in many different forms and should not be construed as being limited to the embodiments set forth herein; rather, there embodiments are provided so that this disclosure will be thorough and complete, and will fully convey the concept of the invention to those skilled in the art.

Hereinafter, a mobile terminal relating to the present invention will be described below in more detail with reference to the accompanying drawings. In the following description, suffixes "module" and "unit" are given to components of the mobile terminal in consideration of only facilitation of description and do not have meanings or functions discriminated from each other.

The mobile terminal described in the specification can include a cellular phone, a smart phone, a laptop computer, a digital broadcasting terminal, personal digital assistants (PDA), a portable multimedia player (PMP), a navigation system and so on.

Figure 1:
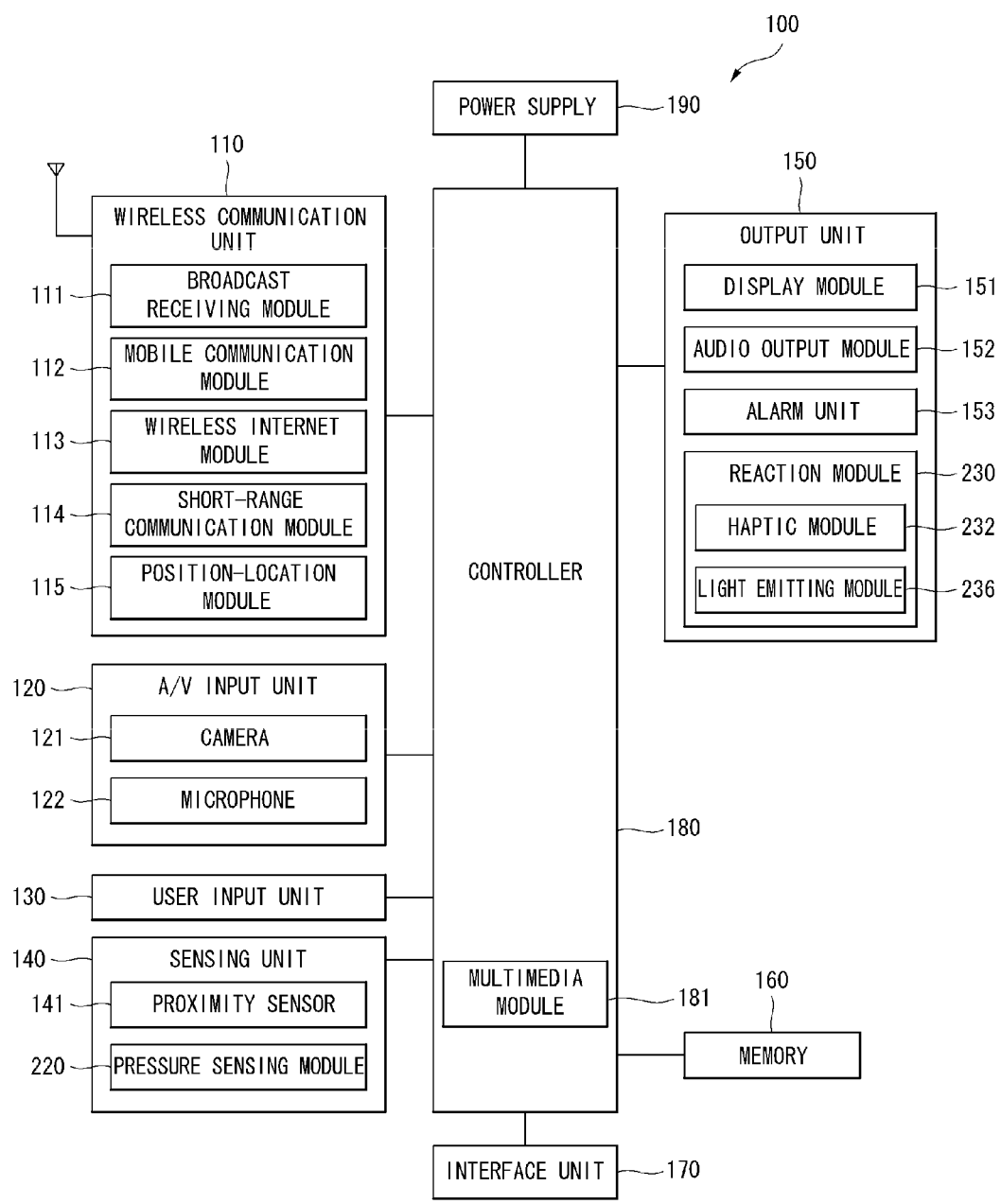
FIG. 1 is a block diagram of a mobile terminal according to an embodiment of the present invention.

FIG. 1 is a block diagram of a mobile terminal 100 according to an embodiment of the present invention. The mobile terminal 100 can include a radio communication unit 110, an audio/video (A/V) input unit 120, a user input unit 130, a sensing unit 140, an output unit 150, a memory 160, an interface 170, a controller 180, and a power supply 190. The components shown in FIG. 1 are not essential parts and the number of components included in the mobile terminal can be varied.

The components of the mobile terminal will now be described.

The radio communication unit 110 can include at least one module that enables radio communication between the mobile terminal 100 and a radio communication system or between the mobile terminal 100 and a network in which the mobile terminal 100 is located. For example, the radio communication unit 110 can include a broadcasting receiving module 111, a mobile communication module 112, a wireless Internet module 113, a local area communication module 114 and a position information module 115.

The broadcasting receiving module 111 receives broadcasting signals and/or broadcasting related information from an external broadcasting management server through a broadcasting channel.

The broadcasting channel can include a satellite channel and a terrestrial channel. The broadcasting management server can be a server that generates and transmits broadcasting signals and/or broadcasting related information or a server that receives previously created broadcasting signals and/or broadcasting related information and transmits the broadcasting signals and/or broadcasting related information to a terminal. The broadcasting signals can include not only TV broadcasting signals, radio broadcasting signals and data broadcasting signals but also signals in the form of combination of a TV broadcasting signal and a radio broadcasting signal.

The broadcasting related information can be information on a broadcasting channel, a broadcasting program or a broadcasting service provider. The broadcasting related information can be provided even through a mobile communication network. In this case, the broadcasting related information can be received by the mobile communication module 112.

The broadcasting related information can exist in various forms. For example, the broadcasting related information can exist in the form of electronic program guide (EPG) of digital multimedia broadcasting (DMB) or in the form of electronic service guide (ESG) of digital video broadcast-handheld (DVB-H).

The broadcasting receiving module 111 receives broadcasting signals using various broadcasting systems. Particularly, the broadcasting receiving module 111 can receive digital broadcasting signals using digital broadcasting systems such as digital multimedia broadcasting-terrestrial (DMB-T), digital multimedia broadcasting-satellite (DMB-S), media forward link only (MediaFLO), DVB-H and integrated services digital broadcast-terrestrial (ISDB-T) systems. The broadcasting receiving module 111 can be constructed to be suited to broadcasting systems providing broadcasting signals other than the above-described digital broadcasting systems.

The broadcasting signals and/or broadcasting related information received through the broadcasting receiving module 111 can be stored in the memory 160.

The mobile communication module 112 transmits/receives a radio signal to/from at least one of a base station, an external terminal and a server on a mobile communication network. The radio signal can include a voice call signal, a video telephony call signal or data in various forms according to transmission and receiving of text/multimedia messages.

The wireless Internet module 113 means a module for wireless Internet access and can be included in the mobile terminal 100 or externally attached to the mobile terminal 100. Wireless LAN (WLAN) (Wi-Fi), wireless broadband (Wibro), world interoperability for microwave access (Wimax), high speed downlink packet access (HSDPA) and so on can be used as a wireless Internet technique.

The local area communication module 114 means a module for local area communication. Bluetooth, radio frequency identification (RFID), infrared data association (IrDA), ultra wideband (UWB) and ZigBee can be used as a local area communication technique.

The position information module 115 confirms or obtains the position of the mobile terminal. A global positioning system (GPS) module is a representative example of the position information module 115. According to the current technology, the GPS module 115 can calculate information on distances between one point (object) and at least three satellites and information on the time when the distance information is measured and apply trigonometry to the obtained distance information to obtain three-dimensional position information on the point (object) according to latitude, longitude and altitude at a predetermined time. Furthermore, a method of calculating position and time information using three satellites and correcting the calculated position and time information using another satellite is also used. In addition, the GPS module 115 continuously calculates the current position in real time and calculates velocity information using the position information.

Referring to FIG. 1, the A/V input unit 120 is used to input an audio signal or a video signal and can include a camera 121 and a microphone 122. The camera 121 processes image frames of still images or moving images obtained by an image sensor in a video telephony mode or a photographing mode. The processed image frames can be displayed on a display unit 151.

The image frames processed by the camera 121 can be stored in the memory 160 or transmitted to an external device through the radio communication unit 110. The mobile terminal 100 can include at least two cameras according to constitution of the terminal.

The microphone 122 receives an external audio signal in a call mode, a recording mode or a speed recognition mode and processes the received audio signal into electric audio data. The audio data can be converted into a form that can be transmitted to a mobile communication base station through the mobile communication module 112 and output in the call mode. The microphone 122 can employ various noise removal algorithms for removing noise generated when the external audio signal is received.

The user input unit 130 receives input data for controlling the operation of the terminal from a user. The user input unit 130 can include a keypad, a dome switch, a touch pad (constant voltage/capacitance), jog wheel, jog switch and so on.

The sensing unit 140 senses the current state of the mobile terminal 100, such as open/close state of the mobile terminal 100, the position of the mobile terminal 100, whether a user touches the mobile terminal 100, the direction of the mobile terminal 100 and acceleration/deceleration of the mobile terminal 100 and generates a sensing signal for controlling the operation of the mobile terminal 100. For example, the sensing unit 140 can sense whether a slide phone is opened or closed when the mobile terminal 100 is the slide phone. Furthermore, the sensing unit 140 can sense whether the power supply 190 supplies power and whether the interface 170 is connected to an external device. The sensing unit 140 can include a proximity sensor. The sensing unit 140 can include a pressure sensing module 220.

The output unit 150 generates visual, auditory or tactile output and can include the display unit 151, an audio output module 152, an alarm 153 and a reaction module 230.

The display unit 151 displays information processed by the mobile terminal 100. For example, the display unit 151 displays UI or graphic user interface (GUI) related to a telephone call when the mobile terminal is in the call mode. The display unit 151 displays a captured or/and received image, UI or GUI when the mobile terminal 100 is in the video telephony mode or the photographing mode.

The display unit 151 can include at least one of a liquid crystal display, a thin film transistor liquid crystal display, an organic light-emitting diode display, a flexible display and a three-dimensional display.

Some of these displays can be of a transparent type or a light transmission type. This can be referred to as a transparent display. The transparent display includes a transparent liquid crystal display. The rear structure of the display unit 151 can also be of the light transmission type. According to this structure, a user can see an object located behind the body of the mobile terminal 100 through an area of the body of the mobile terminal 100, which is occupied by the display unit 151.

The mobile terminal 100 can include at least two display units 151 according to constitution of the terminal. For example, the mobile terminal 100 can include a plurality of displays that are arranged on a single face at a predetermined distance or integrated. Otherwise, the plurality of displays can be arranged on different sides.

In the case where the display unit 151 and a sensor sensing touch (referred to as a touch sensor hereinafter) form a layered structure, which is referred to as a touch screen hereinafter, the display unit 151 can be used as an input device in addition to an output device. The touch sensor can be in the form of a touch film, a touch sheet and a touch pad, for example.

The touch sensor can be constructed such that it converts a variation in pressure applied to a specific portion of the display unit 151 or a variation in capacitance generated at a specific portion of the display unit 151 into an electric input signal. The touch sensor can be constructed such that it can sense pressure of touch as well as the position and area of touch.

When touch input is applied to the touch sensor, a signal corresponding to the touch input is transmitted to a touch controller. The touch controller processes the signal and transmits data corresponding to the processed signal to the controller 180. Accordingly, the controller 180 can detect a touched portion of the display 151.

Referring to FIG. 1, the proximity sensor 141 can be located in an internal region of the mobile terminal, surrounded by the touch screen, or near the touch screen. The proximity sensor senses an object approaching a predetermined sensing face or an object located near the proximity sensor using electromagnetic force or infrared rays without having mechanical contact. The proximity sensor has lifetime longer than that of a contact sensor and has wide application.

The proximity sensor includes a transmission type photoelectric sensor, a direct reflection type photo-electric sensor, a mirror reflection type photo-electric sensor, a high-frequency oscillating proximity sensor, a capacitive proximity sensor, a magnetic proximity sensor, an infrared proximity sensor, etc.

A capacitive touch screen is constructed such that proximity of a pointer is detected through a variation in an electric field according to the proximity of the pointer. In this case, the touch screen (touch sensor) can be classified as a proximity sensor.

For convenience of explanation, an action of approaching the pointer to the touch screen while the pointer it not being in contact with the touch screen such that location of the pointer on the touch screen is recognized is referred to as "proximity touch" and an action of bring the pointer into contact with the touch screen is referred to as "contact touch" in the following description. A proximity touch point of the pointer on the touch screen means a point of the touch screen to which the pointer corresponds perpendicularly to the touch screen when the pointer proximity-touches the touch screen.

The proximity sensor senses proximity touch and a proximity touch pattern (for example, a proximity touch distance, a proximity touch direction, a proximity touch velocity, a proximity touch time, a proximity touch position, a proximity touch moving state, etc.). Information corresponding to the sensed proximity touch action and proximity touch pattern can be displayed on the touch screen.

The audio output module 152 can output audio data received from the radio communication unit 110 or stored in the memory 160 in a call signal receiving mode, a telephone call mode or a recording mode, a speech recognition mode and a broadcasting receiving mode. The audio output module 152 outputs audio signals related to functions (for example, a call signal incoming tone, a message incoming tone, etc.) performed in the mobile terminal 100. The audio output module 152 can include a receiver, a speaker, a buzzer, etc.

The alarm 153 outputs a signal for indicating generation of an event of the mobile terminal 100. Examples of events generated in the mobile terminal include receiving of a call signal, receiving of a message, input of a key signal, input of touch, etc. The alarm 153 can output signals in forms different from video signals or audio signals, for example, a signal for indicating generation of an event through vibration. The video signals or the audio signals can be also output through the display unit 151 or the audio output module 152.

The reaction module 230 can generate various feedback effects that the user can recognize. The reaction module 230 includes a haptic module 232 and a light emitting module 236.

The haptic module 232 generates various haptic effects that the user can feel. A typical example of the haptic effects generated by the haptic module 232 includes vibration. The intensity and pattern of vibrations generated by the haptic module 232 are controllable. For example, different vibrations can be combined together and output, or sequentially output.

In addition to vibrations, the haptic module 232 can generate various haptic effects, including the effect of stimulation from an array of vertically moving pins on a contacted skin surface, the effect of stimulation by the jet force or suction force of air through a jet orifice or inlet, the effect of stimulation by light touch on the skin surface, the effect of stimulation from contact with an electrode, the effect of stimulation by static electricity, the effect of reproduction of cold and warm sensations by a device capable of absorbing or generating heat, and so forth.

The haptic module 232 may be implemented in such a manner as to allow the user feel a haptic effect through the muscular sense of the fingers or arms, as well as providing a haptic effect by direct contact. Two or more haptic modules 232 can be provided according to the configuration aspect of the mobile terminal 100.

The light emitting module 236 includes illuminators (234 of FIG. 4), and can operate in response to a pressure signal generated from the pressure sensing module 220. The light emitting module 236 performs operations, including light emission, periodic/aperiodic flickering, etc. according to user operation, thereby transmitting a constant signal to the user.

The memory 160 can store a program for the operation of the controller 180 and temporarily store input/output data (for example, phone book, messages, still images, moving images, etc.). The memory 160 can store data about vibrations and sounds in various patterns, which are output from when a touch input is applied to the touch screen.

The memory 160 can include at least one of a flash memory, a hard disk type memory, a multimedia card micro type memory, a card type memory (for example, SD or XD memory), a random access memory (RAM), a static RAM (SRAM), a read-only memory (ROM), an electrically erasable programmable ROM (EEPROM), a programmable ROM (PROM) magnetic memory, a magnetic disk and an optical disk. The mobile terminal 100 can operate in relation to a web storage performing the storing function of the memory 160 on the Internet.

The interface 170 serves as a path to all external devices connected to the mobile terminal 100. The interface 170 receives data from the external devices or power and transmits the data or power to the internal components of the mobile terminal 100 or transmits data of the mobile terminal 100 to the external devices. The interface 170 can include a wired/wireless headset port, an external charger port, a wired/wireless data port, a memory card port, a port for connecting a device having a user identification module, an audio I/O port, a video I/O port, an earphone port, etc., for example.

An identification module is a chip that stores information for authenticating the authority to use the mobile terminal 100 and can include a user identify module (UIM), a subscriber identify module (SIM) and a universal subscriber identify module (USIM). A device (referred to as an identification device hereinafter) including the identification module can be manufactured in the form of a smart card. Accordingly, the identification device can be connected to the mobile terminal 100 through a port.

The interface 170 can serve as a path through which power from an external cradle is provided to the mobile terminal 100 when the mobile terminal 100 is connected to the external cradle or a path through which various command signals inputted by the user through the cradle to the mobile terminal 100. The various command signals or power input from the cradle can be used as a signal for confirming whether the mobile terminal 100 is correctly set in the cradle.

The controller 180 controls the overall operation of the mobile terminal. For example, the controller 180 performs control and processing for voice communication, data communication and video telephony. The controller 180 can include a multimedia module 181 for playing multimedia. The multimedia module 181 can be included in the controller 180 or separated from the controller 180.

The controller 180 can perform a pattern recognition process capable of recognizing handwriting input or picture-drawing input applied to the touch screen as characters or images.

The power supply 190 receives external power and internal power and provides power required for the operations of the components of the mobile terminal under the control of the controller 180.

Various embodiments of the present invention can be implemented in a computer or similar device readable recording medium using software, hardware or a combination thereof, for example.

According to hardware implementation, the embodiments of the present invention can be implemented using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electrical units for executing functions. In some cases, the embodiments can be implemented by the controller 180.

According to software implementation, embodiments such as procedures or functions can be implemented with a separate software module executing at least one function or operation. Software codes can be implemented according to a software application written in an appropriate software language. Furthermore, the software codes can be stored in the memory 160 and executed by the controller 180.

Figure 2:
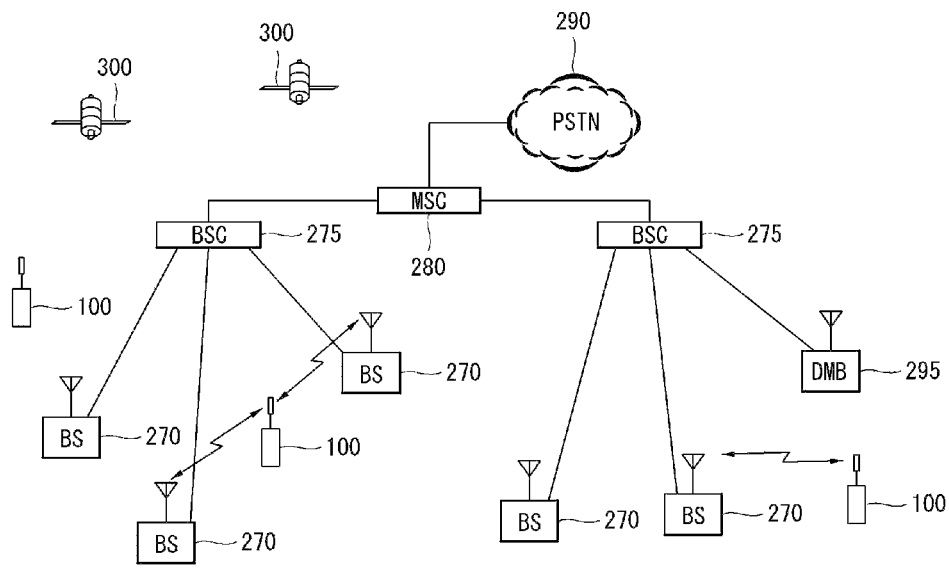
FIG. 2 is a block diagram of a CDMA wireless communication system communicating with the mobile terminal of FIG. 1.

FIG. 2 depicts several global positioning system (GPS) satellites 300. Such satellites facilitate locating the position of some or all of the mobile terminals 100. While two GPS satellites 300 are depicted in FIG. 2, it will be apparent to those skilled in the art that useful positioning information may be obtained with greater or fewer satellites. Alternatively, other types of position detection technology, for example, a location technology that may be used in addition to or instead of GPS location technology, are available. If desired, some or all of the GPS satellites 300 may alternatively or additionally be configured to provide satellite DMB transmissions.

During typical operation of the wireless communication system, the base stations 270 receive sets of reverse-link signals from various mobile terminals 100. The mobile terminals 100 engage in calls, messaging, and other communications. Each reverse-link signal received by a given base station 270 is processed within that base station. The resulting data is forwarded to an associated base station controller 275. The base station controller 275 provides call resource allocation and mobility management functionality including the orchestration of soft handoffs between the base stations 270. The base station controllers 275 also route the received data to the mobile switching centers (MSC) 280 which provides additional routing services for interfacing with the public switched telephone network (PSTN) 290. Similarly, the PSTN 290 interfaces with the MSC 280, and the MSC interfaces with the base station controllers 275, which in turn control the base stations 270 to transmit sets of forward-link signals to the mobile terminals 100.

Figure 3:
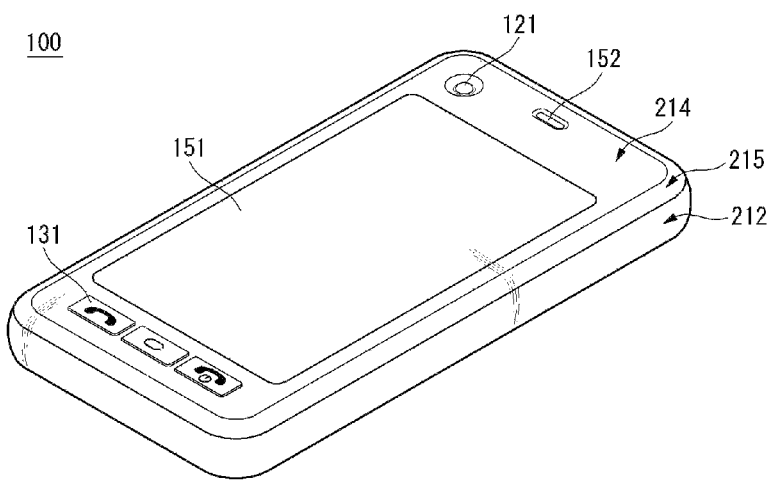
FIG. 3 is a perspective view of the mobile terminal according to an embodiment of the present invention.
Figure 4:
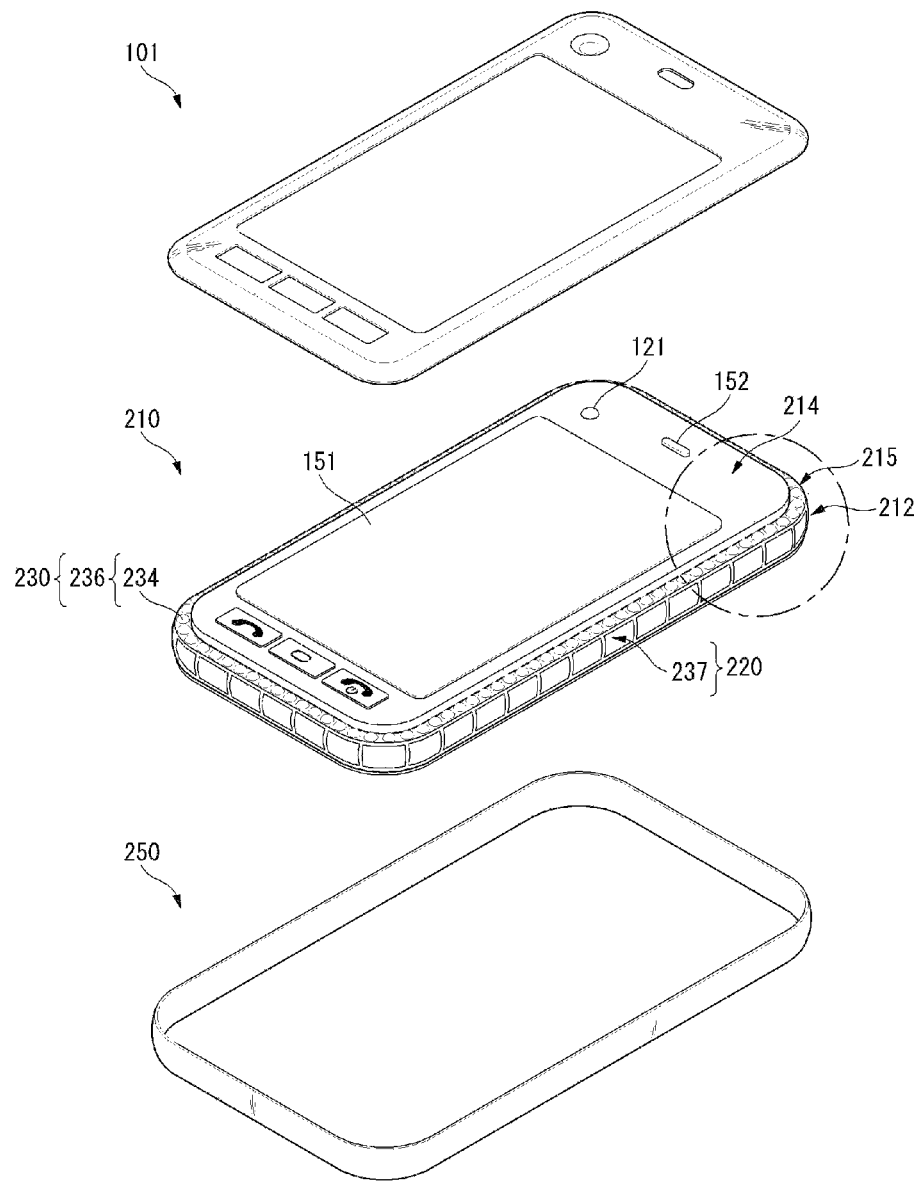
FIG. 4 is an exploded perspective view of the mobile terminal of FIG. 3.

FIG. 3 is a perspective view of the mobile terminal according to an embodiment of the present invention. FIG. 4 is an exploded perspective view of the mobile terminal of FIG. 3.

As shown in these drawings, the mobile terminal 100 according to an embodiment of the present invention includes a body 210, a pressure sensing module 220 provided along the lateral portion 212 of the body 210, a protection cover 250 enclosing the pressure sensing module 220, a reaction module 230 provided along a front edge portion 215 formed by the front portion 214 and lateral portion 212 of the body 210, and a control portion 240 for controlling the reaction module 230.

The body 210 constitutes the frame of the mobile terminal 100. Although FIG. 3 depicting one embodiment of the present invention shows a bar-type body 210, the shape of the body 210 may be implemented in a variety of configurations including a slide-type, a folder-type, a swing-type, a swivel-type, etc. A display unit 151 for displaying images, a sound output portion 152, a camera 121, etc. may be disposed on the body 210. The front portion 214 of the body 210 can be protected by a front case (101 of FIG. 4) which may be formed of a synthetic resin by injection molding, or a metallic material such as stainless steel (STS) or titanium (Ti). The front case (101 of FIG. 4) may be formed of a transparent, semi-transparent, or opaque material. The inner space of the body 210 can incorporate various electronic parts. The pressure sensing module 220, protected by the protection cover 250, is provided on the lateral surface of the body 210.

The protection cover 250 can enclose the lateral sides of the body 210 in a belt shape. The protection cover 250 protects the pressure sensing module 220, and facilitates transmission of a pressure to the pressure sensing module 220. The protection cover 250 is formed of an elastic silicon material. When a pressure is applied, the protection cover 250 is deformed and transmits the pressure to the pressure sensing module 220, and when the pressure is released, it can restore its original shape. Further, the protection cover 250 may be formed of a soft fabric material to improve the operational feeling of the user. While one protection cover 250 according to one embodiment of the present invention has been illustrated as enclosing the lateral sides of the body 210, several parts of the protection cover 250 may be assembled to the body 210.

The pressure sensing module 220 can sense changes in pressure including a grip force applied to the body 210. The pressure sensing module 220 may be provided on the lateral portion 212 of the body 210. In order to change the position of the mobile terminal 100 or operate the mobile terminal 100, the user generally grips the lateral portion 212 of the mobile terminal 100. In one embodiment of the present invention, by positioning the pressure sensing module 220 on the lateral portion 212, the user is able to operate the mobile terminal 100 simply by gripping the body 210 of the mobile terminal 100 without any particular motion. While one embodiment of the present invention has been described with respect to a case where the pressure sensing module 220 is positioned on the lateral portion 212, the position of the pressure sensing module 220 is not limited thereto and the pressure sensing module 220 may be mounted on anywhere of the body 210 that the user feels comfortable with.

The pressure sensing module 220 may be provided consecutively on the lateral portion 212. That is, it may be disposed along the upper, lower, left, and right lateral sides of the mobile terminal 100. As the pressure sensing module 220 is consecutively disposed at the entire part of the lateral portion 212, an image displayed on the display unit 151 can be scrolled by sweeping the lateral portion 212.

The pressure sensing module 220 is different from a typical switch capable of sensing on/off changes alone according to a pressure applied from the user in that it can sense a change in pressure in two or more degrees. That is, the pressure sensing module 220 senses stages of change in pressure in at least two degrees, and preferably, it can linearly and continuously sense a change in pressure. The linear sensing of a pressure means that even a slight change in pressure applied to the pressure sensing module 220 can be sensed because the range of threshold pressures for sensing a degree of change in pressure is narrow. However, the linear sensing does not mean full continuation in a mathematical sense, but means that minute changes can be sensed better than by a conventional sensor that senses a mere difference between on and off.

Figure 5:
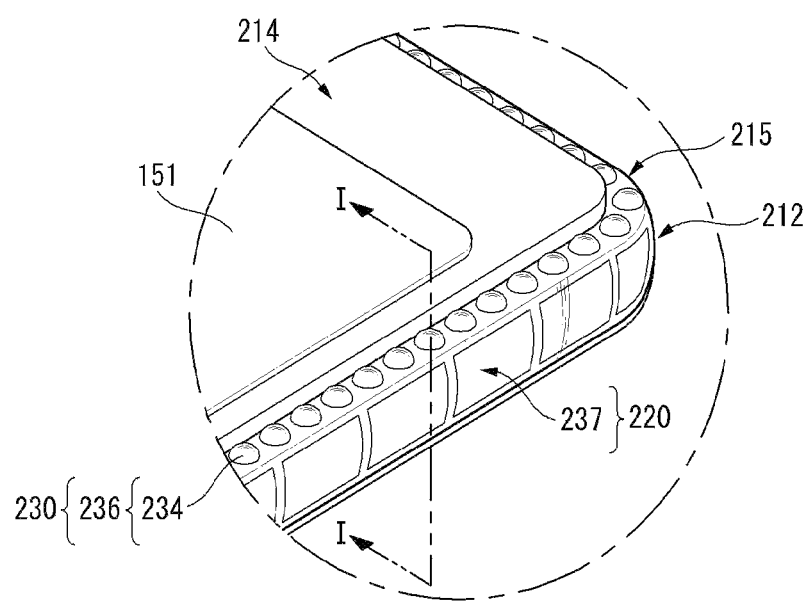
FIG. 5 is an enlarged view of part A of FIG. 4.
Figure 6:
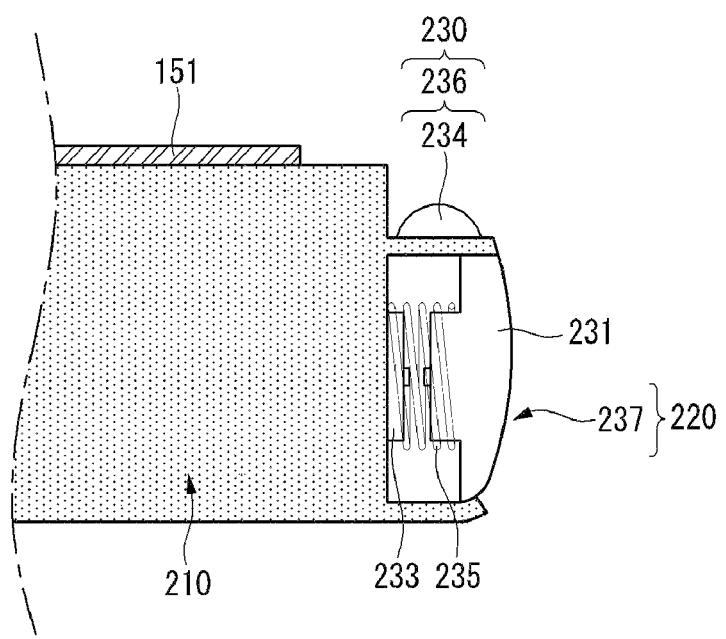
FIG. 6 is a cross-sectional view taken along direction I-I of FIG. 5.

FIG. 5 is an enlarged view of part A of FIG. 4. FIG. 6 is a cross-sectional view taken along direction I-I of FIG. 5.

Hereinafter, the pressure sensing module 220 and the reaction module 230 of the mobile terminal according to an embodiment of the present invention will be described concretely with reference to these drawings.

As mentioned above, the pressure sensing module 220 is consecutively provided on the lateral portion 212. The pressure sensing module 220 includes a plurality of pressure sensing elements 237.

The pressure sensing elements 237 are a part that substantially receives a pressure and converts it into a pressure signal. The pressure sensing elements 237 may be provided in plural number on the lateral portion 212. The pressure sensing elements 237 may include hall sensors and touch sensors. The hall sensor is a sensor that employs a hall effect. The hall effect refers to the potential difference between an area in which electric charges are accumulated and an area in which electric charges are not accumulated when electrons are directed towards a specific direction. The hall effect may occur by moving an object with electric charges within a magnetic field. A sensor using such a hall effect is a hall sensor. The detailed configuration and operation of the hall sensor are well known to those skilled in the art, so a detailed description of the hall sensor will be omitted. In the following description, reference numeral 237 of the pressure sensing element is used to denote the hall sensor.

The hall sensor 237 includes a pressure transmitting portion 231, a sensing portion 233, and a return spring 235 for giving elastic force to the pressure transmitting portion 231. The pressure transmitting portion 231 moves in a direction getting close the sensing portion 233 by a pressure transmitted through the protection cover (250 of FIG. 4). When the external force to the pressure transmitting portion 231 is released, the pressure transmitting portion 231 returns to its original position by the elastic force of the return spring 235. When the distance between the pressure transmitting portion 231 and the sensing portion 233 is changed by the external force and the elastic force, a potential difference is generated. The potential difference is sensed by the sensing portion 233. The potential difference sensed by the sensing portion 233 is continuously varied according to the distance between the pressure transmitting portion 231 and the sensing portion 233. Thus, it is possible to obtain a pressure signal which varies according to the intensity of pressure by sensing a variation in potential difference. The reaction of the reaction module 230 may differ by the pressure signal generated by the hall sensor 237.

The reaction module 230 allows the user to recognize a point where a pressure is generated and the intensity of the pressure. That is, if the pressure gradually increases, the reaction of the reaction module 230 may also gradually increase. The reaction of the reaction module 230 may be represented by light emission or vibration. Therefore, if the pressure is low, the degree of light emission is small, while if the pressure becomes higher, more intense light can be emitted. Also, if the pressure is low, vibration is weak while if the pressure becomes higher, vibration becomes more intense. Such an example can be varied in a number of ways, such as the degree of flickering, the continuity of vibration, and so on. As described above, the reaction module 230 may be capable of reactions, such as vibration by the haptic module 236. The following description will be made in detail with respect to a case where the reaction module 230 is a light emitting module 236 which reacts with light.

The light emitting module 236 may be provided along the front edge portion 215 formed by the front portion 214 of the body 210. With the light emitting module 236 being provided on the front edge portion 215, the user who operates the mobile terminal (100 of FIG. 3) from the front can visually recognize the light emitted from the light emitting module 236 with ease. However, the position of the light emitting module 236 is not limited thereto, but the light emitting module 236 may be mounted in various positions in terms of user visibility and design aspects. The light emitting module 236 can include illuminators 234.

The illuminators 234 are a part which actually emits light by a pressure signal. The illuminators may be provided in plural number along the front edge portion 215. With the illuminators 234 consecutively provided along the front edge portion 215, the illuminator 234 positioned most adjacent to a point where a pressure signal is generated can be operated. That is, the user can visually recognize which position is pressurized by operating the illuminator 234 closest to the position pressurized by the user. Also, a user's input can be induced by adapting the illuminator 234, adjacent to the point the user has to apply pressure for a specific operation, to emit light. While the embodiment of the present invention has been described with respect to a case where a plurality of illuminators are provided, an illuminator of a belt shape capable of selectively emitting light at a specific position is also applicable.

Figure 7:
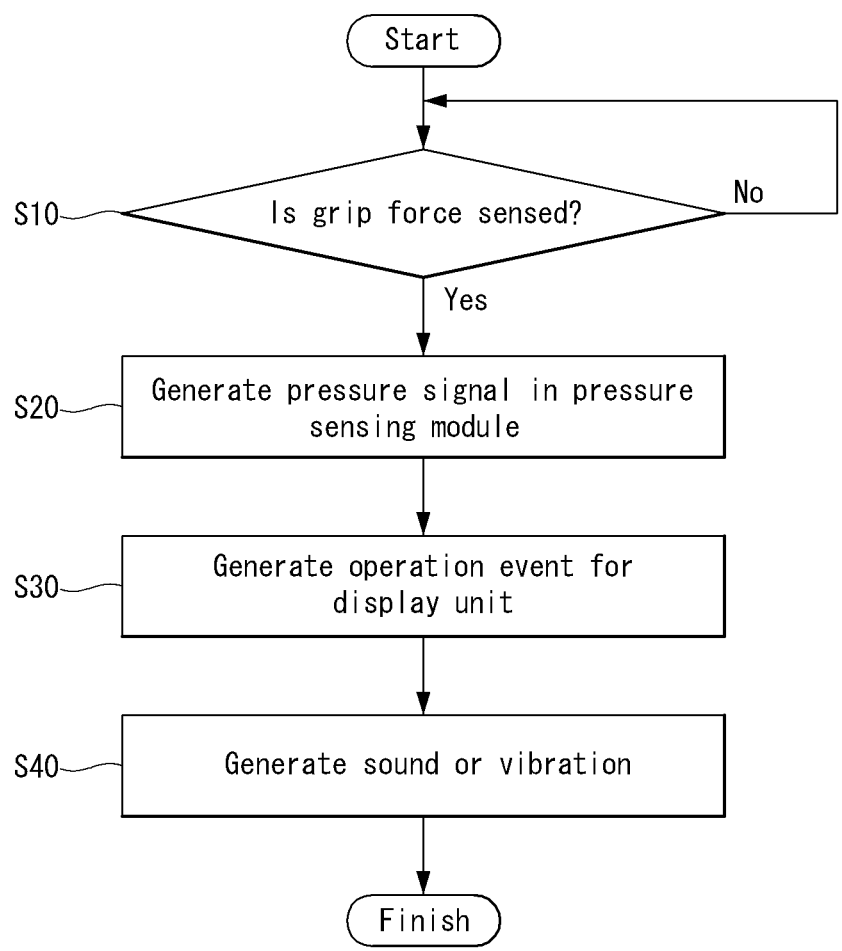
FIG. 7 is a flow chart of a control method of the mobile terminal of FIG. 3.

FIG. 7 is a flow chart of a control method of the mobile terminal of FIG. 3

As shown therein, the mobile terminal according to one embodiment of the present invention senses whether a pressure is sensed or not (S10). The pressure may be a grip force on the mobile terminal. The control portion determines whether or not a change in pressure is sensed through the pressure sensing module provided on the lateral surface of the mobile terminal.

When a change in pressure is sensed, the pressure sensing module provided with the pressure sensing elements generates a pressure signal (S20). A kinetic energy from an external force is converted into an electric signal, which is an electric energy, through the pressure sensing elements. The converted electric signal is a pressure signal. The pressure signal is varied according to the presence or absence of a pressure, intensity, duration, etc. That is, when the pressure on the pressure sensing elements increases, the pressure signal, too, increases. Thus, the control portion, which has received the pressure signal, is able to recognize whether or not the pressure on the body of the mobile terminal is changed.

When a pressure signal is generated, an operation event occurs to the display unit in response to the pressure signal (S30). That is, a specific operation previously set in response to the pressure signal is applied to the display unit. The operation event to the display unit is capable of changing the color or brightness of the display unit, changing an image displayed on the display unit, scrolling the image displayed on the display unit, and so forth. Each operation event to the display unit will be described in detail below.

When a pressure signal is generated, a sound or vibration may be generated in response to the pressure signal (S40). That is, according to the intensity of the pressure signal, a specific sound may be generated from a speaker, or the amplitude of the generated sound may be varied. Also, according to the intensity of the pressure signal, vibration from the haptic module may be generated, or the degree of the generated vibration may be varied. Of course, a pattern for generating sound and vibration may be varied according to the pressure signal. The generation of sound and vibration and changes thereof may arouse user interest in the mobile terminal.

Figure 8A:
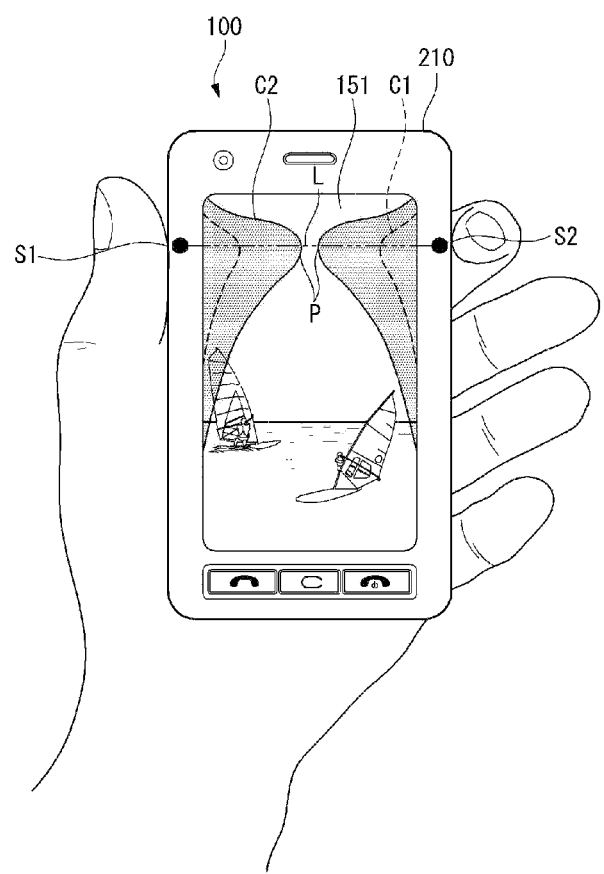
FIG. 8a is a view showing an operation state of a mobile terminal according to a first embodiment of the present invention.
Figure 8B:
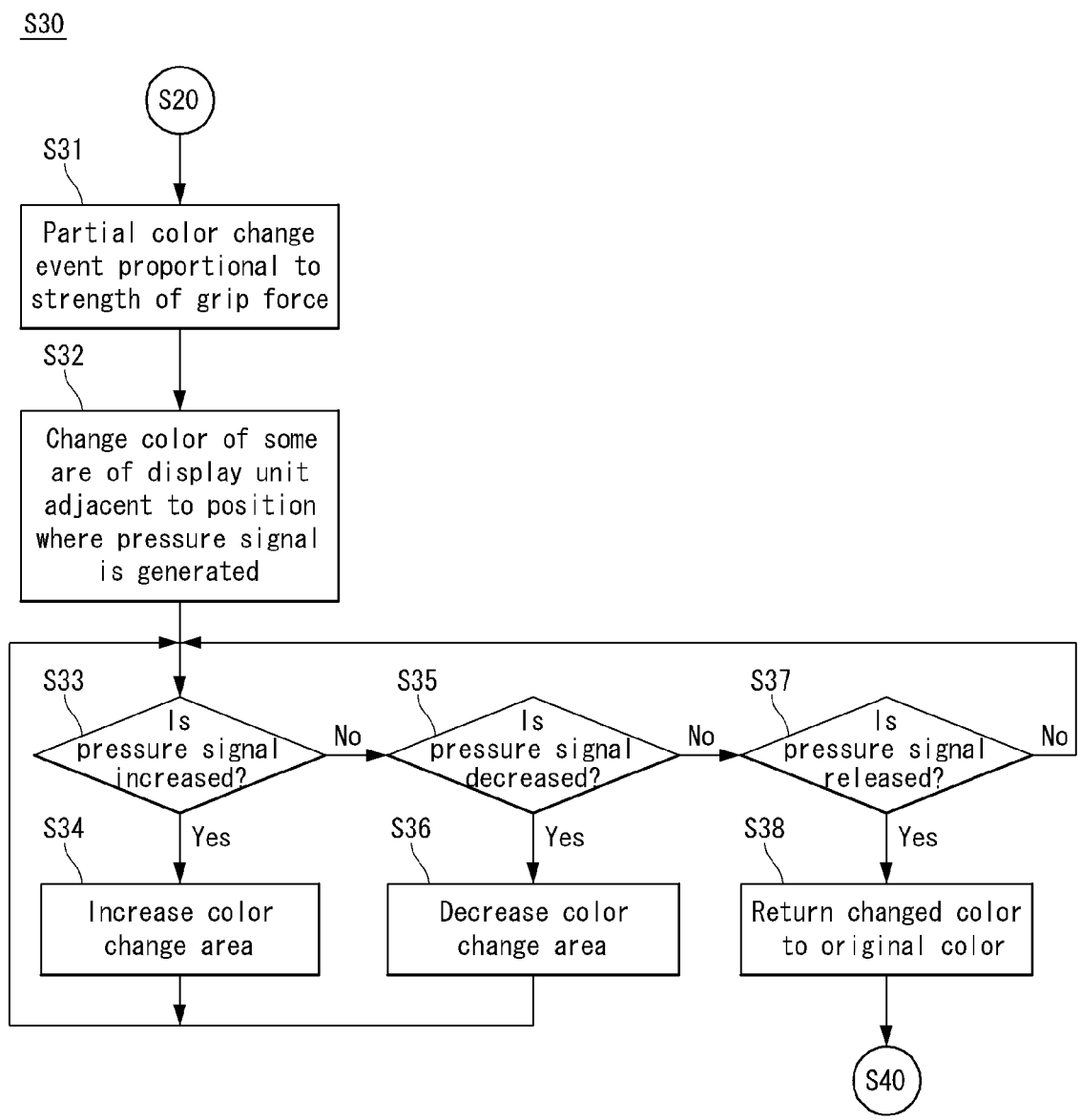

FIG. 8a is a view showing an operation state of a mobile terminal according to a first embodiment of the present invention. FIG. 8b is a flow chart of a control method of the mobile terminal of FIG. 8a.

Hereinafter, the control method of the mobile terminal according to the first embodiment of the present invention will be described in detail with reference to the drawings.

As shown in FIG. 8a, the mobile terminal according to the first embodiment of the present invention can be adapted to display a change in color on the display unit 151 by the user's pressurizing first and second points S1 and S2, which are both lateral sides of the body 210.

When the first and second points S1 and S2 are pressurized, the pressure sensing module (220 of FIG. 5) generates a pressure signal. As described above, the intensity of the pressure signal is varied in proportion to the magnitude of the pressurizing force.

At an initial stage during which the user begins to apply a pressure on the first and second points S1 and S2, the magnitude of the pressurizing force may be relatively small. In this case, the amount of change in the color displayed on the display unit 151 may be small as shown by an initial color change C1.

If the user increases the pressurizing force on the first and second points S1 and S2 and thus the magnitude of the pressurizing force becomes larger than that in the initial stage, the change in the color displayed on the display unit 151 increases as shown by a final color change C2.

A procedure in which the color changes from the initial color change C1 to the final color change C2 may be continuous or discontinuous. The user can observe the display unit 151 where the color is variously changed depending on the degree of gripping of the mobile terminal 100, thereby arousing user interest.

A color change may occur in proportion to the distance between the first and second points S1 and S2, which are pressurized by the user, and the display unit 151 displaying the color change. That is, the closer to the pressurization point, the more the color changes, and the farther from the pressurization point, the less the color changes. Alternatively, it may be also possible that the closer to the pressurization point, the less the color changes, and the farther from the pressurization point, the more the color changes.

If the color changes more toward a pressurization point, a maximum color change point P may be positioned, for example, on a virtual line L connecting the first point S1 and the second point S2.

Meanwhile, the illuminators at the positions corresponding to the first and second points S1 and S2 gripped by the user are operated to thus inform the user of the exact gripping position and arouse visual interest.

As shown in FIG. 8b, when a partial color change event proportional to the intensity of pressure occurs (S31), the color of some area of the display unit adjacent to the position where a pressure signal is generated is changed (S32). Access to the partial color change event proportional to the intensity of pressure can be carried out by the user's selection of a specific menu or by the user's gripping the pressure sensing module according to a previously input pattern.

When the pressure signal increases by a pressure increase (S33), a color change area is increased in proportion to the increase of the pressure signal (S34).

When the pressure signal decreases by a pressure decrease (S35), the color change area is decreased (S36).

Meanwhile, when the user's pressure on the pressure sensing module is released and thus the pressure signal is released (S37), the changed color is restored to the original color displayed on the display unit (S38).

According to the first embodiment of the present invention, various color changes may occur depending on the intensity of pressure applied by the user, thereby providing the effect of arousing the user's interest.

Figure 9:
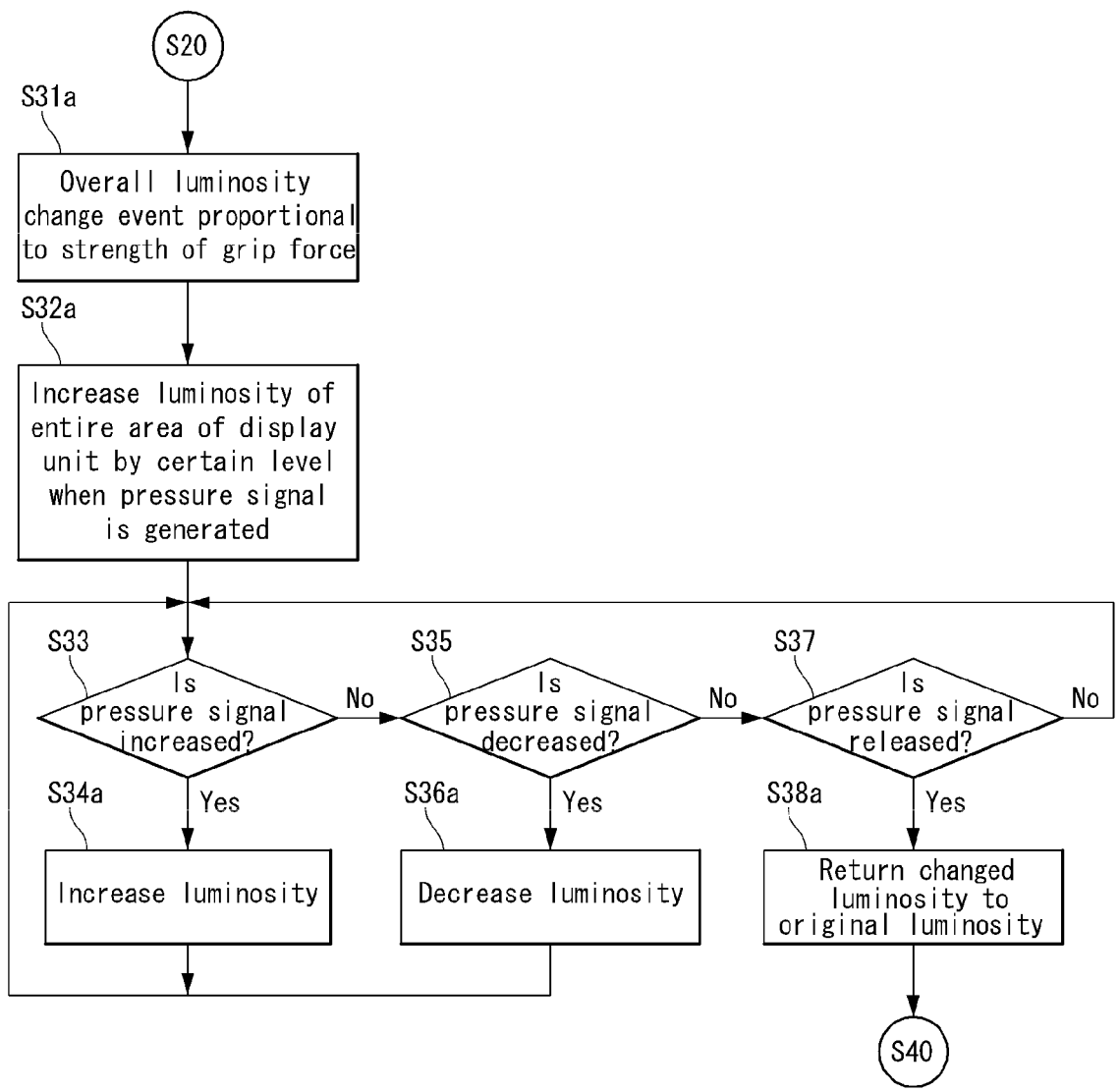
FIG. 9 is a flow chart of a control method of a mobile terminal according to a second embodiment of the present invention.

FIG. 9 is a flow chart of a control method of a mobile terminal according to a second embodiment of the present invention. Only the parts different from the first embodiment of the present invention will be mainly explained, and the parts which are the same as those of the first embodiment are denoted by the same respective reference numerals, and the different parts are denoted by the reference numerals with a suffix "a".

As shown in FIG. 9, in the control method of the mobile terminal according to the second embodiment of the present invention, an overall brightness change event proportional to the intensity of pressure may occur (S31a).

When a brightness change event occurs, the brightness of the entire area of the display unit is increased by a certain level in response to a pressure signal (S32a). Once the brightness of the entire area of the display unit becomes higher, this results in an increase of the brightness of the display unit.

If the pressure signal increases (S33) or the pressure signal decreases (S35), the brightness of the entire display unit is increased (S34a) or decreased (S35a). If the brightness is continuously increased, the mobile terminal can be used as an alternative to a flash lamp in a dark place.

Meanwhile, when the user's pressure on the pressure sensing module is released and thus the pressure signal is released (S37), the changed brightness is restored to the original brightness (S38a).

Figure 10A:
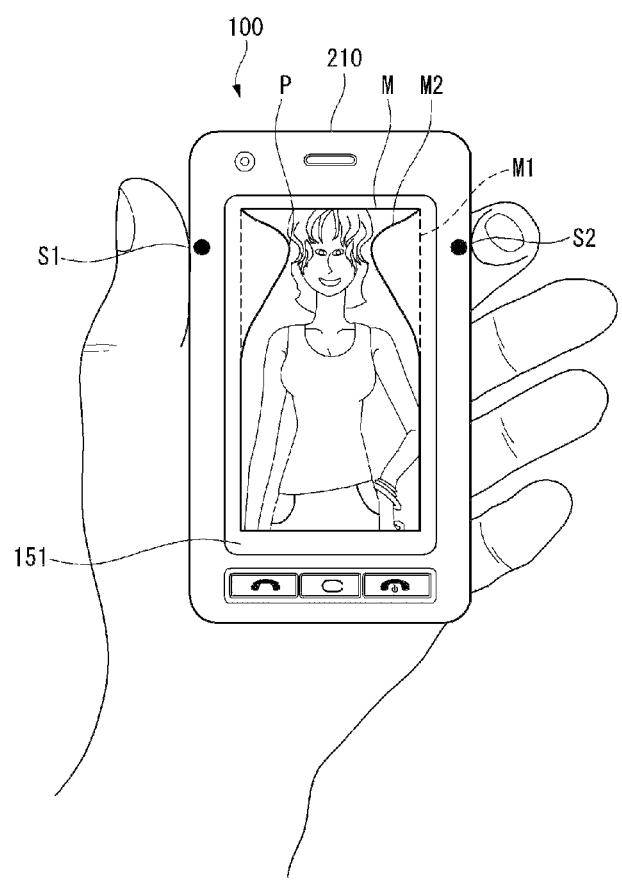
FIG. 10a is a view showing an operation state of a mobile terminal according to a third embodiment of the present invention.
Figure 10B:
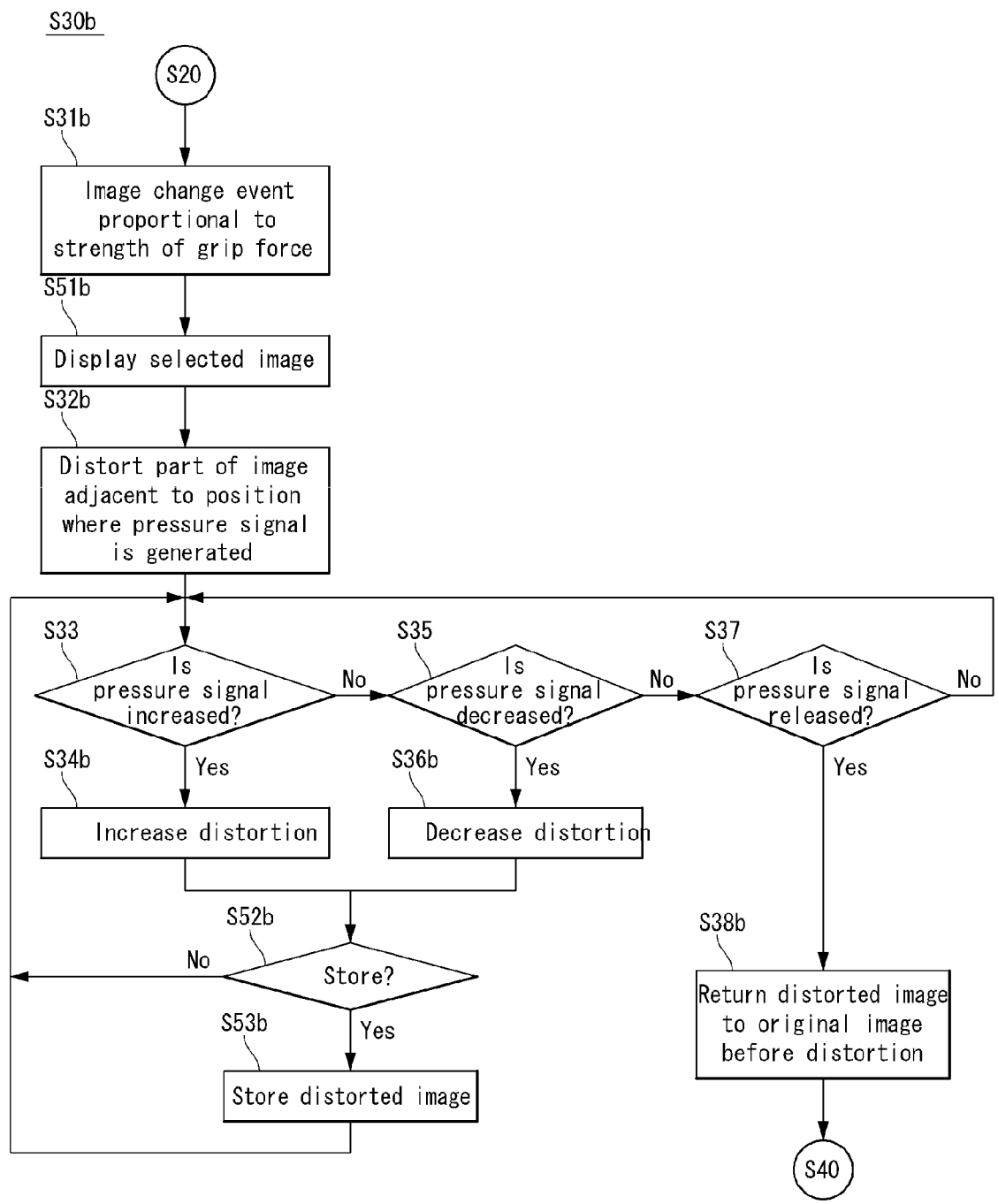

FIG. 10a is a view showing an operation state of a mobile terminal according to a third embodiment of the present invention. FIG. 10b is a flow chart of a control method of the mobile terminal of FIG. 10a. Only the parts different from the first embodiment of the present invention will be mainly explained, and the parts which are the same as those of the first embodiment are denoted by the same respective reference numerals, and the different parts are denoted by the reference numerals with a suffix "b".

As shown in FIG. 10a, the user can change the shape of a specific figure (M) displayed on the display unit 151 by gripping a specific part of the mobile terminal 100.

The user can grip the first and second points S1 and S2, which are specific points of the lateral sides of the body 210 while applying pressure thereto. Once the user grips the first and second points S1 and S2, a pressure signal is generated according to the pressure.

After displaying the specific figure (M) on the display unit 151, the user applies pressure to the lateral sides of the body 10 adjacent to a part of the displayed figure (M), the shape of which is desired to be changed by the user.

If the pressure against the lateral sides of the body 210 is increased and decreased, the contour of the figure (M) corresponding to the point, where the pressure is generated, is distorted when changed. That is, the contour of the figure (M) changes from the original figure (M1) to a distorted figure (M2).

As for the degree of distortion of the figure (M), a maximum distortion point P can be generated at a part adjacent to the first and second points S1 and S2 where the pressure is generated.

After changing the figure (M) to a degree desired by the user, the changed figure (M) can be stored in the memory (160 of FIG. 1) as it is, so that it can be displayed again later or transmitted to the outside through the wireless communication unit (110 of FIG. 1).

As shown in FIG. 10b, if an image change event occurs in proportion to the intensity of pressure (S31b), an image selected by the user is displayed (S51b). That is, the user can select an image that they want to distort the figure thereof.

When the selected image is displayed, some part of the image adjacent to the position where the pressure signal is generated is distorted (S32b).

If the pressure signal increases (S33) or the pressure signal decreases (S35), the degree of distortion of the image is increased (S34b) or decreased (S36b).

It is determined whether to store the distorted and changed image or not (S52b), and then the changed image is stored in the memory (S53b). Since the user may want to store a partly distorted and changed image, the function for storing a changed image is provided.

When the pressure is released and thus the pressure signal is released (S37), the changed image is restored to the original figure, and the image change event is finished (S38b).

Figure 11A:
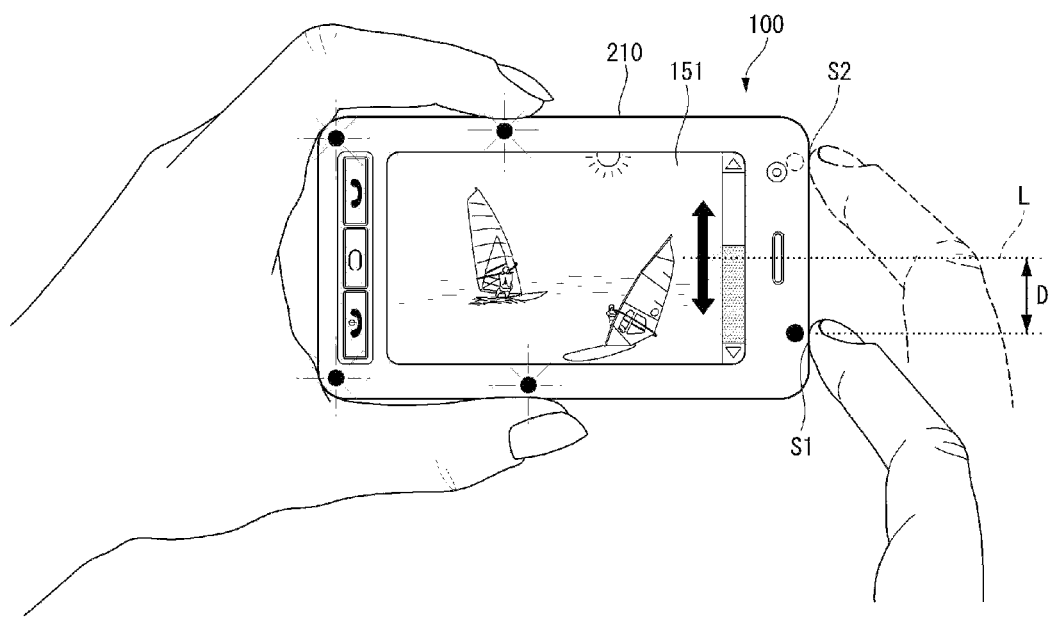
FIG. 11a is a view showing an operation state of a mobile terminal according to a fourth embodiment of the present invention.
Figure 11B:
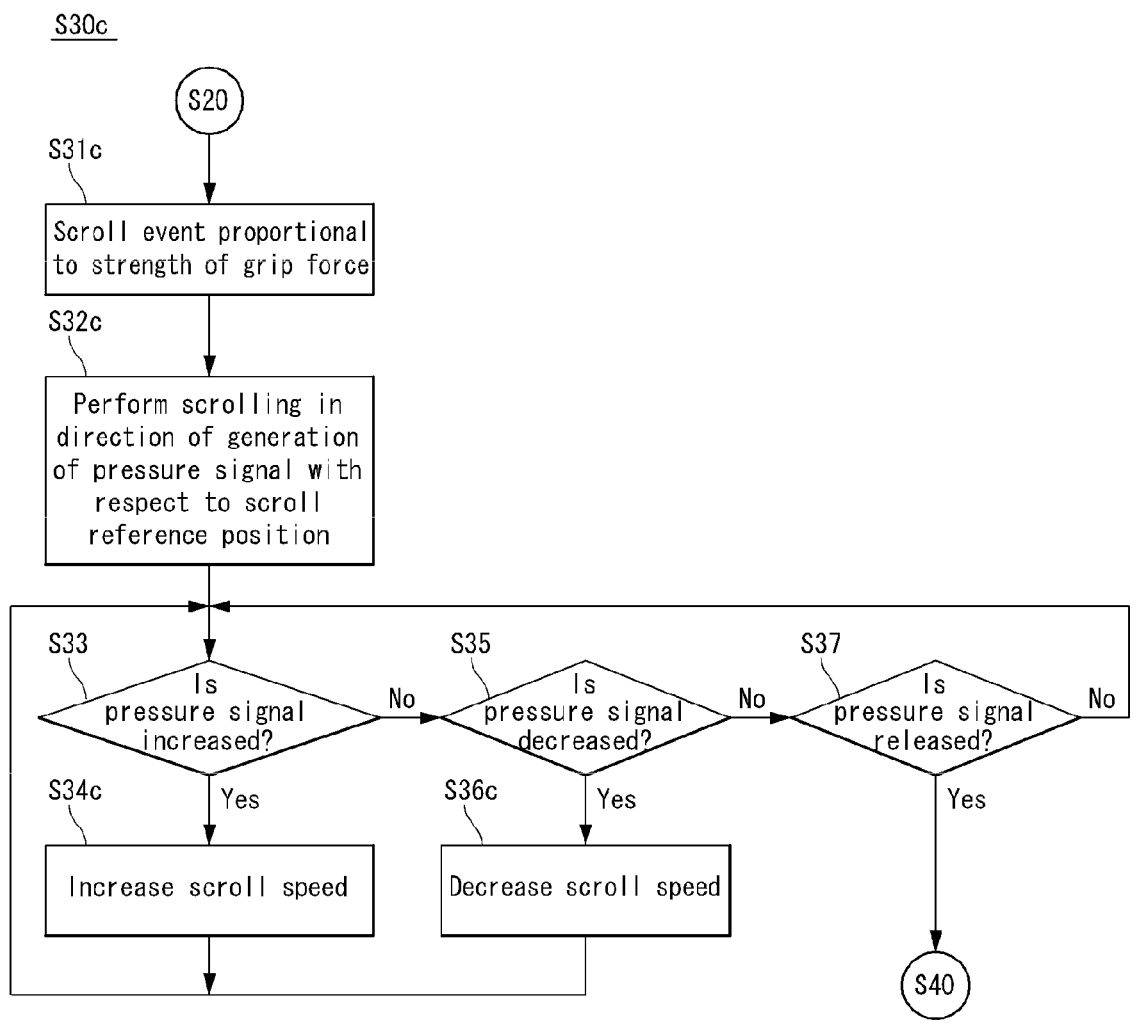

FIG. 11a is a view showing an operation state of a mobile terminal according to a fourth embodiment of the present invention. FIG. 11b is a flow chart of a control method of the mobile terminal of FIG. 11a. Only the parts different from the first embodiment of the present invention will be mainly explained, and the parts which are the same as those of the first embodiment are denoted by the same respective reference numerals, and the different parts are denoted by the reference numerals with a suffix "c".

As shown in FIG. 11a, the user can scroll an image displayed on the display unit 151 by applying pressure to the lateral sides of the body 210 of the mobile terminal 100.

As shown therein, if a displayed image is larger than the display limit of the display unit 151, the user needs to scroll the screen in order view a non-displayed part.

The user can pressurize the first point S1 of a lateral side of the body 210. If the user pressurizes the first point S1 which is positioned more toward one side from a virtual scroll reference position L, the screen is scrolled in the direction of the first point S1.

The scroll reference position L refers to a position at which scrolling up and down is not performed upon application of pressure on the corresponding part. Therefore, if the first point S1 positioned lower than the scroll reference position L is pressurized, scrolling down is performed, and if the second point S2 positioned higher than the scroll reference position L is pressurized, scrolling up is performed.

When pressurizing the first point S1, if the user pressurizes it with a stronger force, the scroll-down speed may be increased in proportion to the degree of pressurization. Therefore, if a part desired to be viewed is far from the current display, the first point S1 is pressurized strongly to thus enable fast scrolling. Otherwise, if a part desired to be viewed is close to the current display, the first point S1 is pressurized weakly to thus enable slow scrolling on the screen.

By pressurizing the second point S2 positioned higher than the scroll reference position L in a similar manner to the pressurization of the first point S1, the user can scroll up the screen.

The scroll speed can be adjusted according to the distance between the scroll reference position L and the pressurized position. That is, if the offset distance D, which is the distance between the scroll reference position L and the pressurized first point S1 is large, the scroll speed can be increased, while if the offset distance D is small, the scroll speed can be decreased.

Also, the user can scroll the screen by moving from the first point S1 to the second point S2 or vice versa while maintaining contact. That is, if the pressure sensing module (220 of FIG. 5) is pressurized continuously from the first point S1 to the second point S2, the pressure signal contains change information on the movement speed of pressure or the movement direction of pressure according to the speed and direction of pressurization. Accordingly, a control signal generated by the pressure signal containing this information can change the speed and direction of scrolling.

Furthermore, the scroll speed can be varied in proportion to the degree of pressurization by varying the intensity of pressurization on a specific point. That is, if the first point S1 is weakly pressurized, scrolling up may be performed slowly, and if the first point S1 is strongly pressurized, scrolling up may be performs quickly.

As shown in FIG. 11b, a scroll event is generated in proportion to the intensity of pressure (S31c), scrolling is performed in a direction of generation of a pressure signal with respect to the scroll reference position (S32c).

If the pressure signal increases (S33) or the pressure signal decreases (S35), the scroll speed is increased (S34c) or decreased (S36c).

When the pressure signal is released (S37), the scroll event is finished.

FIGS. 12 to 22 are state views of the mobile terminal of FIG. 3. And FIG. 23 is a flow chart of a procedure for an input position changing mode of the mobile terminal of FIG. 3.

The following description will be made in detail about the use state of the mobile terminal according to one embodiment of the present invention with reference to the drawings.

Figure 12:
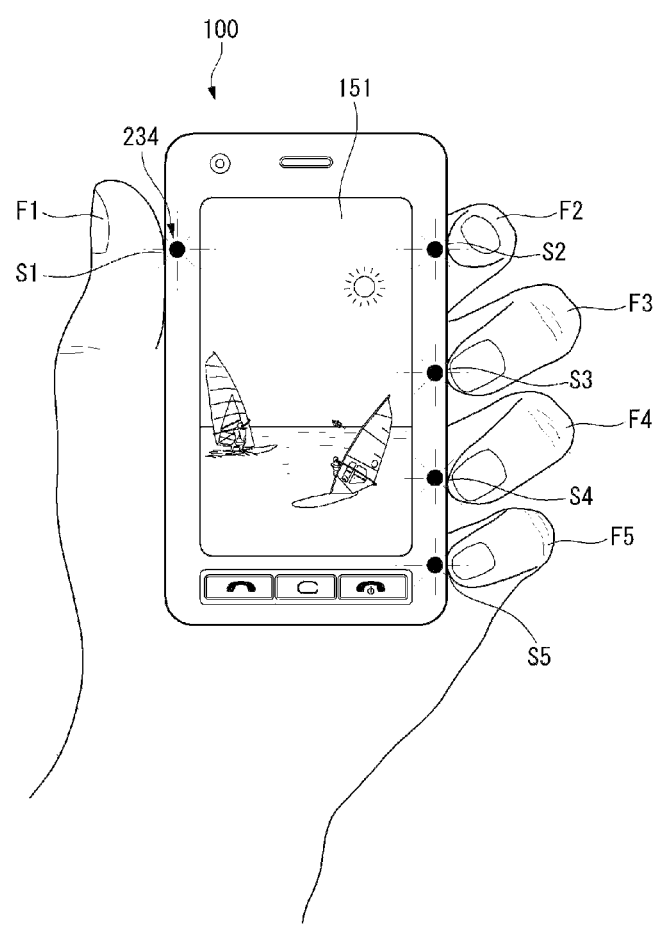
FIGS. 12 to 22 are state views of the mobile terminal of FIG. 3.

As shown in FIG. 12, the user can use the mobile terminal 100 in a portrait direction for vertically displaying an image on the display unit 151 of the mobile terminal 100. In this case, the user can change the direction of the image displayed on the display unit 151 to the portrait direction only by naturally gripping the mobile terminal 100 in the portrait direction.

When gripping the mobile terminal 100 with the left hand, as shown in FIG. 12, the thumb F1 naturally grips the first point S1 which is on the left side of the mobile terminal 100. Also, the index finger to little fingers F2 to F5 generally grip the second to five points S2 to S5. However, the points to be described hereinafter are set for the convenience of description, so it is needless to say that detailed pressurization points for activating/deactivating the functions of the mobile terminal 100 are not limited thereto.

The mobile terminal 100 stores a typical gripping pattern of the user. Thus, the instant the user grips the mobile terminal 100, it is determined whether the gripping motion is consistent with the previously stored pattern. If consistent, the matching function can be activated/deactivated.

Figure 13:
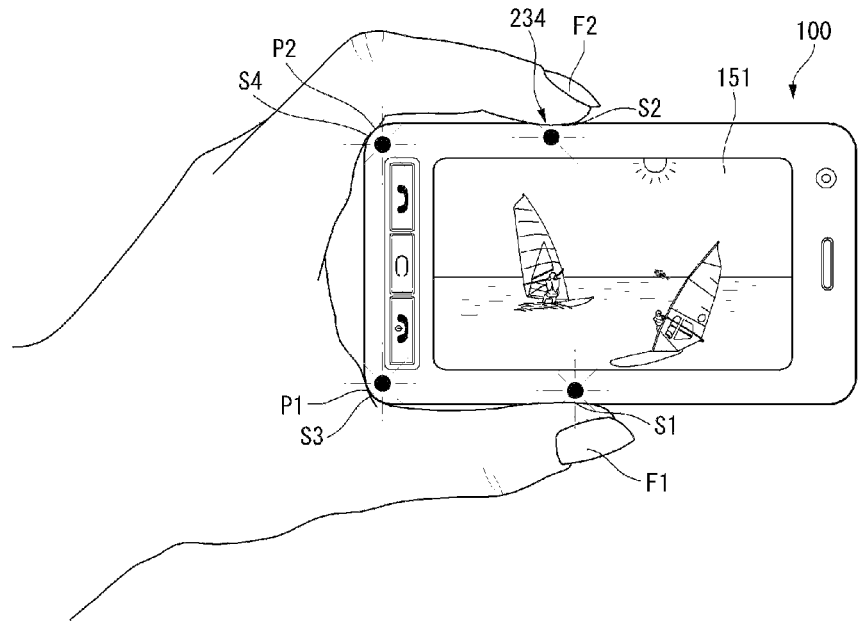

The matching is done according to different pressure signal patterns for different individual pressures. When a specific point of the mobile terminal 100 is pressurized, a pressure signal is generated. As for the pressure signal, a pressurization point, a pressurization force, etc. are different according to the user's grip and the user's specific behavior. That is, in FIGS. 12 and 13, S1 to S5 of FIG. 12 and S1 to S4 of FIG. 13 are different in their positions and pressures for the respective positions. Accordingly, if the differences between the pressure signals depending on a specific grip are figured out, different functions can be matched with the different pressure signals. By this matching operation, a specific function can be performed simply by gripping, thereby increasing use convenience. That is, as shown in FIG. 12, if the user grips the mobile terminal 100, the control unit (180 of FIG. 1) can change the direction of the image displayed on the display unit 151 to the portrait direction without any particular operation.

A user's pressure is sensed by the pressure sensing module (220 of FIG. 4) provided on the lateral surface of the mobile terminal 100. The pressure sensing module (220 of FIG. 4) senses the pressure and transmits it to the control unit (180 of FIG. 1), and the control unit 180 makes the illuminators 234, positioned most adjacent to the first to five points S1 to S5 that are gripped, to emit light. Therefore, the user can visually recognize whether they are gripping rightly or not and the actually gripped part.

FIG. 13 illustrates that the user is gripping the mobile terminal 100 in a landscape direction. In this case, the user can grip the mobile terminal by the thumb F1, index finger F2, and some part of the palm P1 and P2. When pressure is applied to the first to fourth points S1 to s4 by the thumb F1, the control unit (180 of FIG. 1) can determined that the mobile terminal is gripped in the landscape direction. Therefore, the direction of the image displayed on the display unit 151 is changed to the landscape direction, and the illuminators 234 most adjacent to the first to fourth points S1 to S4 are made to emit light.

Figure 14:
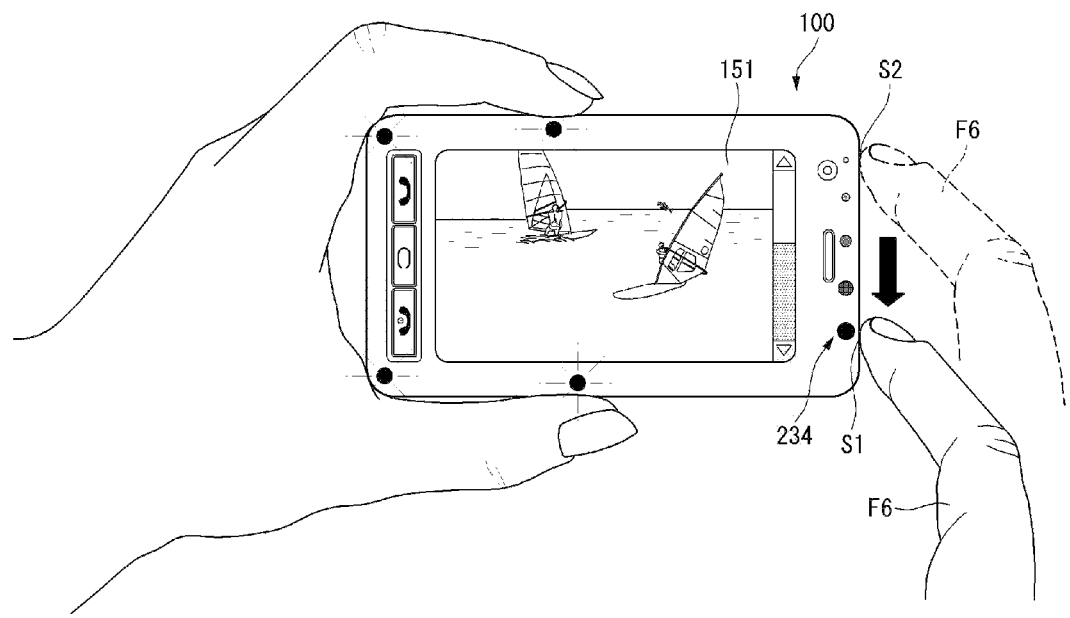

FIG. 14 is a view showing that the user is scrolling on the screen by using the pressure sensing module (220 of FIG. 5) provided on the lateral surface of the mobile terminal 100. The user can sequentially move a pressure signal by moving the finger F6 in an up-down fashion or in a down-up fashion, in a state that the pressure sensing module (220 of FIG. 5), provided on the lateral surface, is pressurized. When a sequentially moving pressure signal is generated, the control unit (180 of FIG. 1) can scroll through the image.

The illuminators 234 make a currently pressurized part S1 brighter than a past pressurized part S2. The past pressurized part S2 enables traces of the finger F6 to be visually represented by sequentially decreasing the intensity of light in the past pressurized part S2.

Figure 15:
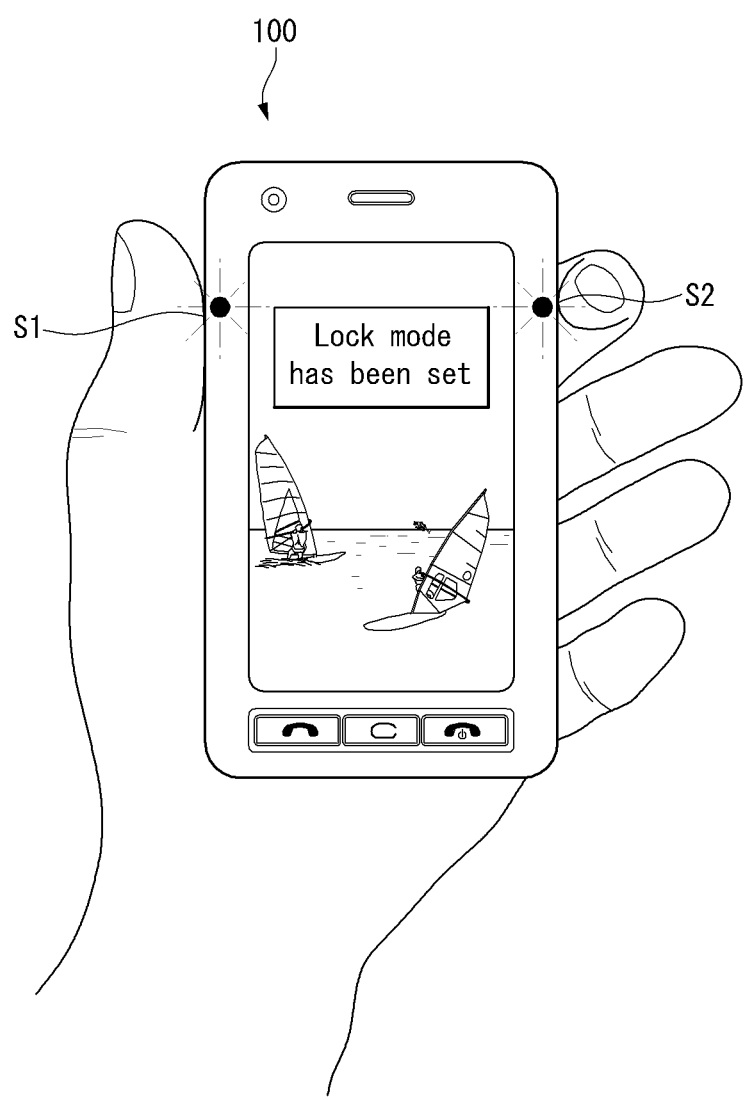
Figure 16:
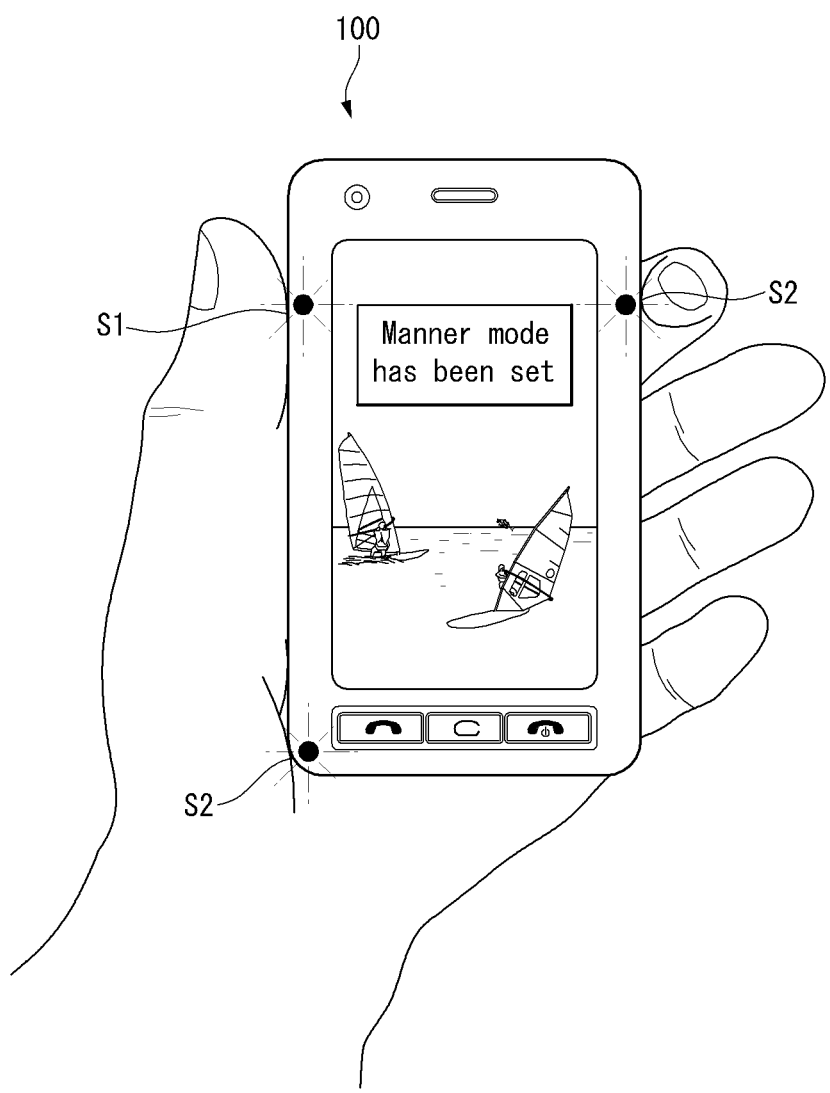

FIG. 15 shows an operation for setting and releasing the lock mode of the mobile terminal. FIG. 16 shows an operation for setting and releasing the manner mode of the mobile terminal.

As shown in the drawings, the inherent functions of the mobile terminal 100 can be activated or deactivated by pressurizing a specific position of the mobile terminal 100. That is, if the positions to be pressurized simultaneously or at regular time intervals are different from each other, the reaction of the mobile terminal 100 may be different, too.

Figure 17:
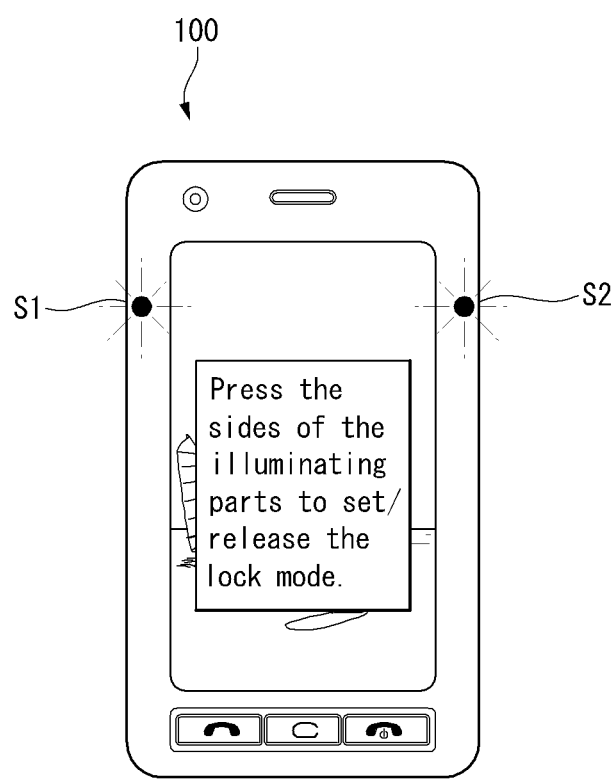

FIG. 17 shows another function of the illuminators.

As shown therein, the illuminators 234 can emit light in order to designate a part requiring to be pressurized for a specific function, such as the setting/release of the lock mode. That is, as shown in FIG. 15, it can be seen that the first and second points S1 and S2 have to be pressurized in order to set the lock mode. However, a user who is not familiar with the mobile terminal 100 may not found which part of the pressure sensing module (220 of FIG. 5) has to be pressurized.

Therefore, the pressurization from the user on the first and second points S1 and S2 can be induced by making the illuminators 234 at the positions corresponding to the first and second positions S1 and S2 emit light.

Figure 18:
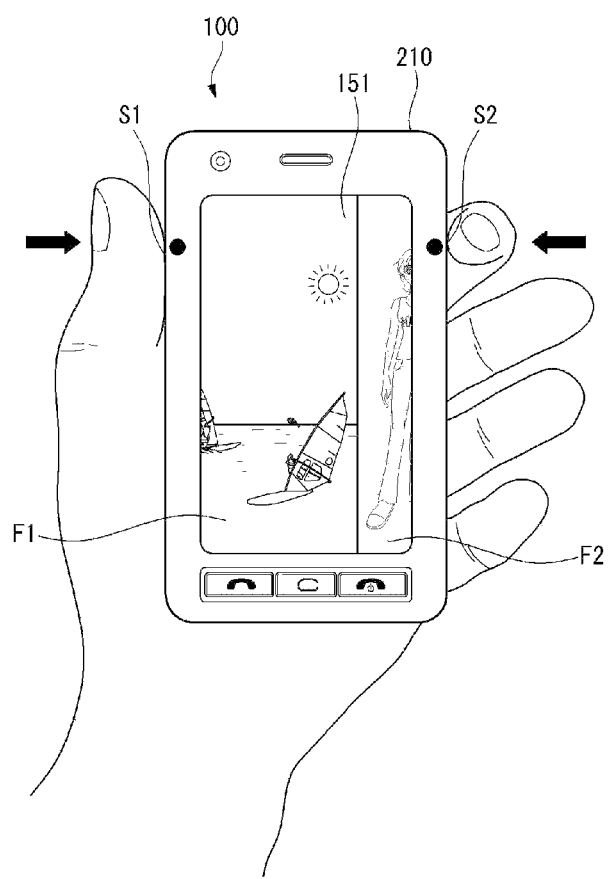
Figure 19:
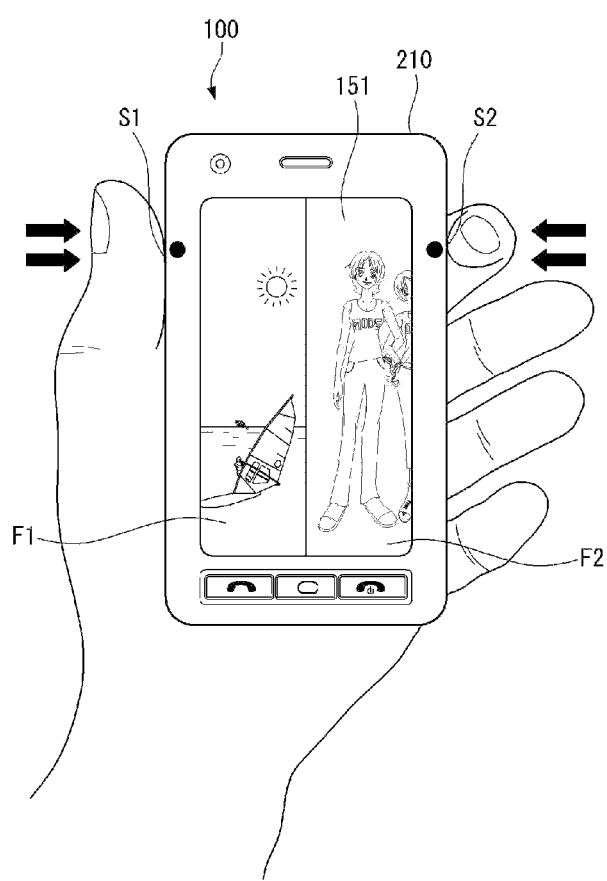
Figure 20:
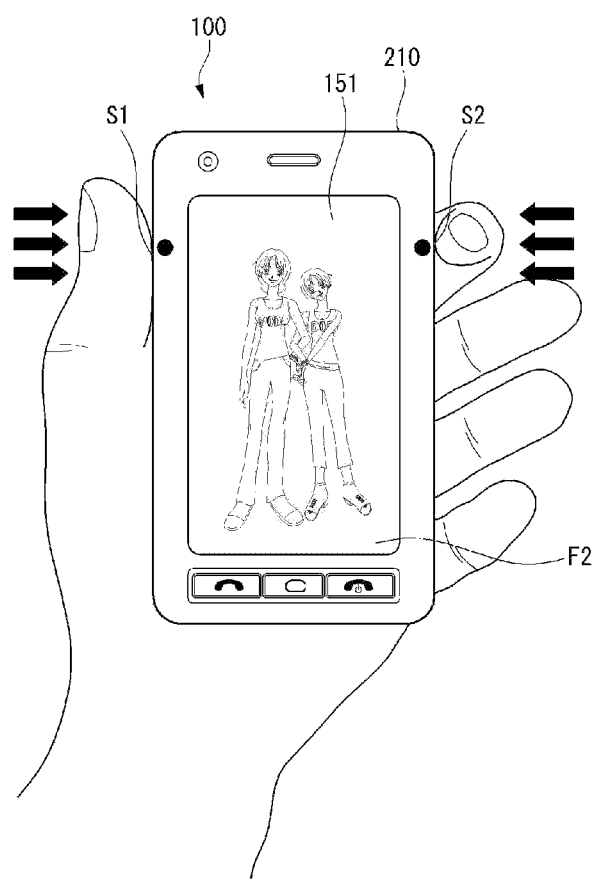

FIGS. 18 to 20 show a control operation of the mobile terminal using the pressure sensing module.

While a first image F1 is being displayed on the display unit 151, the user may want to switch to a second image F2.

As shown in FIG. 18, the user can make part of the second image F2 displayed on the display unit 151 by pressurizing the first and second points S1 and S2. The first and second points S1 and S2 are not limited to the illustrated positions as described above.

The user can change the degree of display of the second image F2 on the display unit 151 by adjusting the degree of pressurizing fore.

As shown in FIG. 19, if the user increases their pressurizing force, the degree of display of the second image F2 can be increased. Also, if the pressurizing force is eliminated in this state, the second image F2 may disappear and only the first image F2 may be displayed on the display unit 151.

As shown in FIG. 20, if the user increases the pressurizing force greater than a threshold pressure, the second image F2 can fully substitute the first image F1 and thus can be displayed on the display unit 151. The user can continuously switch the image to be displayed by repeating the process of FIGS. 18 to 20.

Further, the direction of switching an image can be a forward direction or backward direction by putting a difference in pressurizing force between the first and second points S1 and S2. That is, if the first point S1 is pressurized more strongly than the second point S2 is, the image can be switched to the left direction of the mobile terminal 100, while if the second point is pressurized more strongly than the first point S1 is, the image can be switched to the right direction of the mobile terminal 100.

Figure 21:
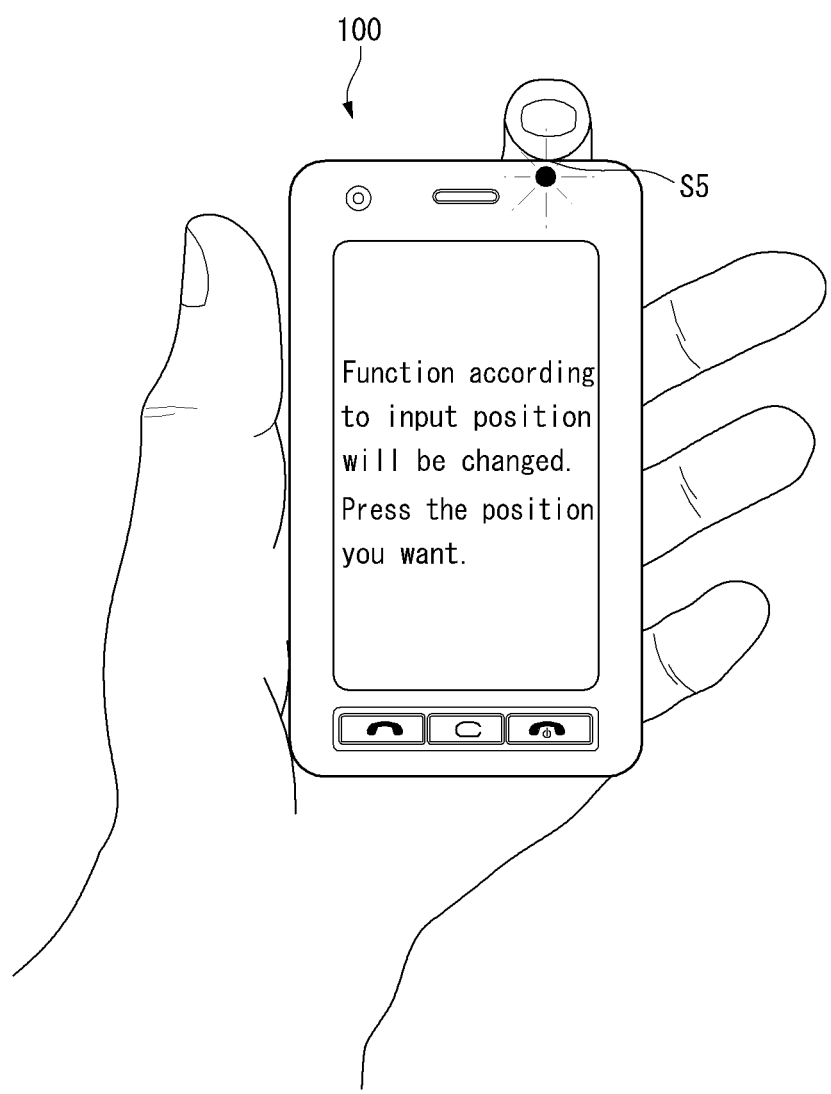

FIGS. 20 and 21 show a process of changing the pressure position of the mobile terminal.

The function of the mobile terminal 100 according to a pressure position, which was set at the time of delivery from the warehouse, may not fit the needs of the user who is actually using the mobile terminal. In this case, the user can change a specific position of the pressure sensing module (220 of FIG. 4) matching a specific function to a position fitting the user's needs.

The specific position (S1 to S3 of FIG. 16) for setting and releasing the manner mode of the mobile terminal has been described in FIG. 16. If the user is not satisfied with this position and pressurizes a user set position S5, they may want to set/release the manner mode.

In this case, as shown in FIG. 21, the user selects a pressure position changing mode and then pressurizes the user set position S5 that the user prefers. It is needless to say that the user set position S5 and the number of pressurized positions may be changed in various ways.

Figure 22:
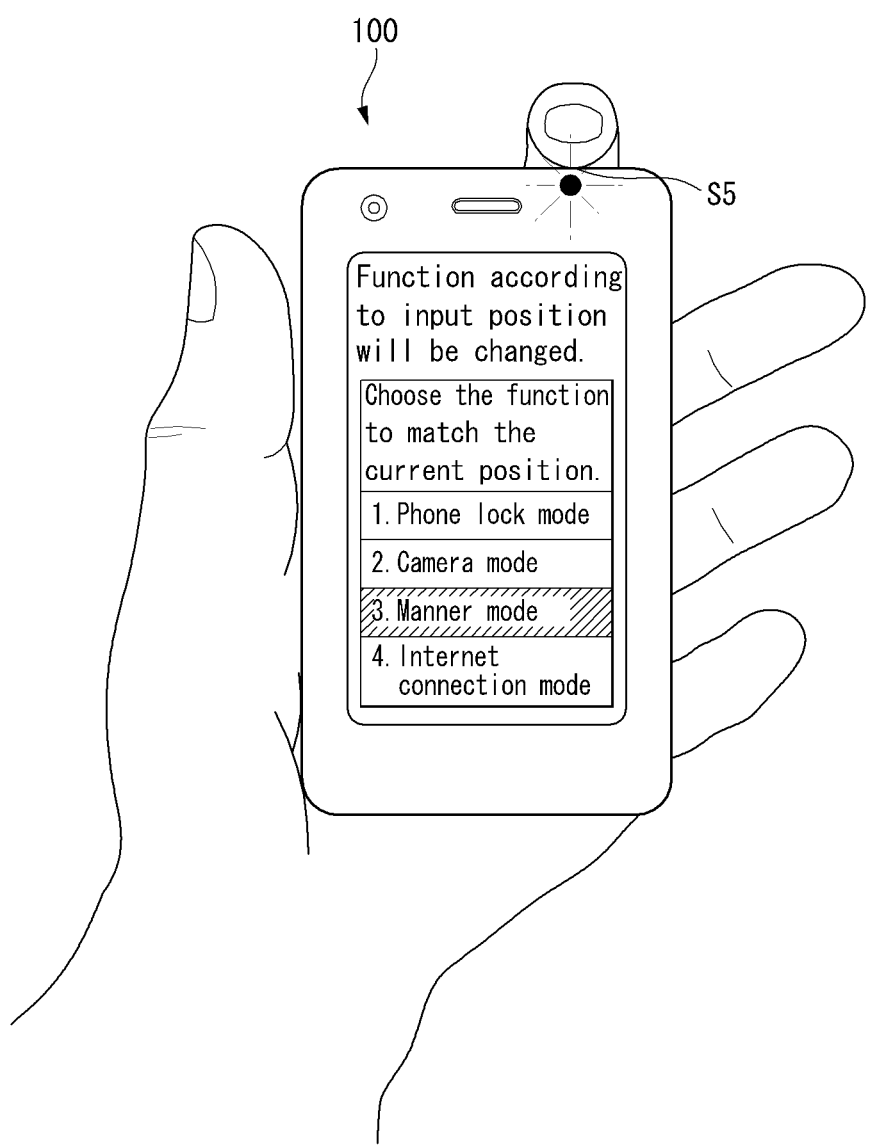
Figure 23:
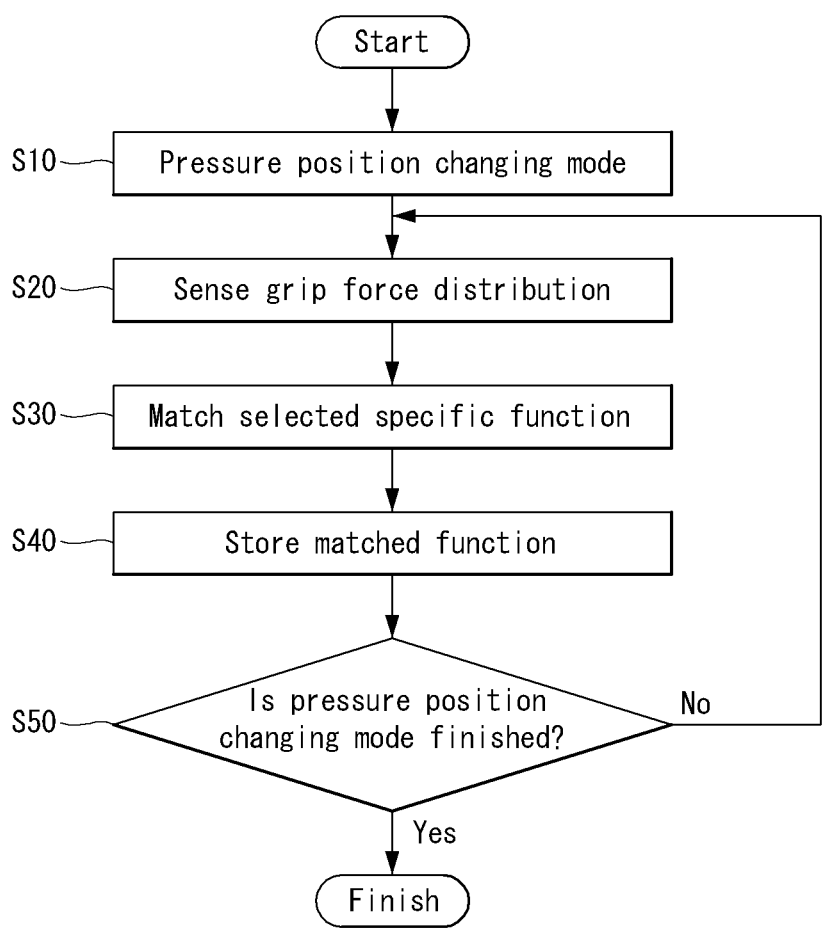
FIG. 23 is a flow chart of a procedure for an input position changing mode of the mobile terminal of FIG. 3.

As shown in FIG. 22, the user set position S5 can be set to a position for setting/releasing the manner mode by selecting a function to match the user set position S5 after pressurizing the user set position S5.

FIG. 23 is a flow chart of a procedure for the pressure position changing mode of the mobile terminal of FIG. 3.

As shown therein, when the mobile terminal enters into the pressure position changing mode (S10), the distribution of pressure generated by gripping the mobile terminal is sensed (S20).

After sensing the distribution of pressure, a specific function to match the distribution of pressure is selected and confirmed (S30).

Once a specific function according to the distribution of pressure is confirmed, the matched function is store (S40). Accordingly, in case of pressurizing a new input position later, a new matched function will be activated.

It is determined whether the pressure position changing mode is finished or not (S50). If not, the above-described operation is repeated.

The foregoing embodiments have been described with respect to a case where the pressure sensing module is provided on the entire part of the lateral surface of the body, it may be provided only at a required part of the lateral surface of the body. For example, the pressure sensing module may be mounted on one vertical lateral side of the terminal to make scrolling easier, and the pressure sensing module may be mounted at some area of one vertical lateral side thereof.

As set forth, the present invention is not limited to the embodiments disclosed above, but it will be apparent to those skilled in the art that various modifications and changes can be made without departing from the spirit and scope of the present invention. Accordingly, all such modifications or changes, if any, are intended to fall within the scope of the present invention as described and set forth herein.

The foregoing embodiments and advantages are merely exemplary and are not to be construed as limiting the present invention. The present teaching can be readily applied to other types of apparatuses. The description of the foregoing embodiments is intended to be illustrative, and not to limit the scope of the claims. Many alternatives, modifications, and variations will be apparent to those skilled in the art.

What is claimed is:

1. A mobile terminal comprising:
a body;
a display unit configured to be located on the body;
a sensing module configured to be located on at least one surface of the body comprising a lateral surface of the body and configured to sense a user's touch applied to at least one part of the sensing module, wherein the sensing module includes a plurality of sensing elements; and
a control unit configured to:
obtain, from the sensing module, at least two signals from at least two positions on the lateral surface,
change a state of the mobile terminal based on the at least two signals, wherein the state reflects touches to the at least two positions,
display an image switching between a first image and a second image based on an intensity of touch sensed through at least one sensing region of the sensing module, wherein the first image and second image are separated from each other,
increase a size of the second image displayed on the display unit and decrease a size of the first image displayed on the display unit based on an increase in the intensity of touch sensed through the at least one sensing region,
remove the second image from the display unit when the intensity of the touch fails to exceed a predetermined value during the image switching, and
substitute the second image for the first image when the intensity of the touch exceeds the predetermined value during the image switching.

2. The mobile terminal of claim 1, wherein the control unit is further configured to:
remove the second image from the display unit and display only the first image when the intensity of touch is less than a first threshold value and the intensity of touch sensed through the at least one sensing region is eliminated during the switch of the displayed image on the display unit from the first image to the second image; and
substitute the second image for the first image when the intensity of the touch sensed through the at least one sensing region is greater than a second threshold value.

3. The mobile terminal of claim 2, wherein the control unit is configured to substitute the second image for the first image based on the intensity of the touch sensed through the at least one sensing region being greater than a third threshold value.

4. The mobile terminal of claim 2, wherein:
the at least one sensing region includes a first sensing region and a second sensing region, and
the control unit is further configured to switch between the first image and the second image based on the at least two signals being simultaneously sensed through both the first sensing region and the second sensing region.

5. The mobile terminal of claim 2, wherein:
the at least one sensing region includes a first sensing region and a second sensing region, and the control unit is further configured to determine a direction of image switching based on a difference of intensity of touches sensed through the first sensing region and second sensing region.

6. A mobile terminal comprising:
a body;
a display unit configured to be located on the body;
a sensing module configured to be located on at least one surface of the body comprising a lateral surface of the body and configured to sense a user's touch applied to at least one part of the sensing module, wherein the sensing module includes a plurality of sensing elements; and
a control unit configured to:
   obtain, from the sensing module, at least two signals from at least two positions on the lateral surface,
   change a state of the display unit based on the at least two signals, wherein changing the state of the display is initiated around the at least two positions,
   display an image switching between a first image and a second image based on an intensity of touch sensed through at least one sensing region of the sensing module, wherein the first image and second image are separated from each other,
   increase a size of the second image displayed on the display unit and decrease a size of the first image displayed on the display unit based on an increase in the intensity of touch sensed through the at least one sensing region,
   remove the second image from the display unit when the intensity of the touch fails to exceed a predetermined value during the image switching, and
   substitute the second image for the first image when the intensity of the touch exceeds the predetermined value during the image switching.

* * * * *